(12) United States Patent
Dembo et al.

(10) Patent No.: US 6,278,981 B1
(45) Date of Patent: *Aug. 21, 2001

(54) COMPUTER-IMPLEMENTED METHOD AND APPARATUS FOR PORTFOLIO COMPRESSION

(75) Inventors: Ron Samuel Dembo, Ontario; Alexander Yacov Kreinin, Thornhill; Dan Rosen, Toronto, all of (CA)

(73) Assignee: Algorithmics International Corporation, Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/084,923

(22) Filed: May 28, 1998

Related U.S. Application Data

(60) Provisional application No. 60/057,927, filed on May 29, 1997.

(51) Int. Cl.[7] .................................................. G06F 17/60
(52) U.S. Cl. ................................................................ 705/36
(58) Field of Search .......................................... 705/36, 37

(56) References Cited

U.S. PATENT DOCUMENTS

| | | | |
|---|---|---|---|
| 4,346,442 | 8/1982 | Musmanno | 364/408 |
| 4,642,768 | 2/1987 | Roberts | 364/408 |
| 4,674,044 | 6/1987 | Kalmus et al. | 364/408 |
| 4,694,397 | 9/1987 | Grant et al. | 364/408 |
| 4,722,055 | 1/1988 | Roberts | 364/408 |
| 4,744,026 | 5/1988 | Vanderbei | 364/402 |
| 4,744,027 | 5/1988 | Bayer et al. | 364/402 |
| 4,744,028 | 5/1988 | Karmarkar | 364/402 |
| 4,752,877 | 6/1988 | Roberts et al. | 364/408 |
| 4,797,839 | 1/1989 | Powell | 364/554 |
| 4,953,085 | 8/1990 | Atkins | 364/408 |
| 5,148,365 | 9/1992 | Dembo | 364/402 |
| 5,774,880 | * 6/1998 | Ginsberg | 705/36 |
| 5,799,287 | * 8/1998 | Dembo | 705/36 |
| 5,893,079 | * 4/1999 | Cwenar | 705/36 |

FOREIGN PATENT DOCUMENTS

| | | |
|---|---|---|
| 90890169 | 5/1990 | (EP) . |
| 0 573 991 A1 | 12/1993 | (EP) . |
| 0 686 926 A2 | 12/1995 | (EP) . |
| 890213953 | 2/1991 | (JP) . |
| 890240605 | 4/1991 | (JP) . |
| 890328405 | 8/1991 | (JP) . |
| PCT/US92/02163 | 9/1992 | (WO) . |
| WO 92 15064 | 9/1992 | (WO) . |
| WO 98/54666 | * 12/1998 | (WO) . |

OTHER PUBLICATIONS

Spinner, Karen, "Growing Pains," Derivatives Strategy, pp. 6–7, Oct. 1996.*

Walker, Richard. "The Greatest Challenge". ICB, pp. 2–4, 1998–1999.*

(List continued on next page.)

*Primary Examiner*—Tariq R. Hafiz
*Assistant Examiner*—Susanna Meinecke-Diaz
(74) *Attorney, Agent, or Firm*—Kenyon & Kenyon

(57) ABSTRACT

A computer-implemented method for compressing a portfolio of financial instruments is described. Financial instruments to be compressed are identified, and a compressed subportfolio corresponding to the identified financial instruments is generated. The compressed subportfolio and any non-compressed financial instruments are then combined into a compressed portfolio.

20 Claims, 7 Drawing Sheets

OTHER PUBLICATIONS

Webb, Andrew. "VAR's Bean–Counter Dilemma". Treasury & Risk Management Technology Buyers' Guide, vol. 8, No. 6, pp. 53–54, 56, 1998.*
Spinner, Karen. "Hedging Credit, Market Risk". Wall Street & Technology Product Digest Supplement, pp. 23–25, Spring 1998.*
Groenfeldt, Tom. "Managing Risk in Real–Time: Is It Worthwhile?". Bank Technology News, Dec. 1, 1997.*
"Algorithmics Announces RiskWatch Release 3.0," PR Newswire, Jun. 1997.*
"Clptimization As A Tool In Finance," Proceedings of the IEEE/IAFE 1997, pp. 64–70, Conference held Mar. 24–25, 1997.*
"Optimization as a Tool in Finance," Proceedings of the IEEE/IAFE 1997, p. 64, Conference held Mar. 24–25, 1997.*
Dembo, Ron & Dan Rosen, "The Practice of Portfolio Replication," Algorithmics Technical Paper Series, 1997.*
Cover, T.M., "Universal Data Compression and Portfolio Selection," IEEE Comput. Soc. Press, Proceedings from the 37th Annual Symposium, 1996.*
"37th Annual Symposium on Foundations of Computer Science," IEEE Computer Society Press, Held Oct. 14–16, 1996.*
"Six Stanford Faculty Elected to National Academy of Engineering," Business Wire, Mar. 1995.*
"The Cafe Behind the Hedge," Open Finance: The Financial Newsletter from Sun Microsystems, Summer 1992.
"DeRosa ARBS Japanes Warrants Against Nikkei Options," Derivatives Week, May, 4, 1992, at 2.
Nailene Chou Wiest, "Portfolio Insurance Gains Favor in FX Management," BC Cycle, Apr. 6, 1992.
Ron S. Dembo and Alan J. King, "Tracking Models and the Optimal Regret Distribution in Asset Allocation," 8 Applied Stochastic Models and Data Analysis 151–157 (1992).
Ron S. Dembo, "Scenario Optimization," 30 Annals of Operations Research 63–80 (1991).
Ron Dembo and Izzy Nelken, "Share the Load," Risk, Apr. 1991.
Craig Torres, "Mathematicians Race to Develop New Kinds of Trading Instruments," The Wall Street Journal, Oct. 18, 1991.
Daniel Stoffman, "The Hedging Hotshot of Bay Street," Canadian Business, Dec. 1990, at 56–59.
Craig Torres, "Synthetic Stock: Future Stand–In for the Real Thing," The Wall Street Journal, Oct. 19, 1990.
Peggie R.Elgin, "Portfolio Hedging Emerges in New Forms to Shield Investments," Corporate Cashflow Magazine, Oct. 1990, at 22.
Saul Hansell, "Is the World Ready for Synthetic Equity," Institutional Investor, Aug. 1990, at 54.
Ron Dembo, "The Art of the Optimum," Risk, Apr. 1990, at 17–21.
Ron Dembo and Parvez Patel, "Protective Basket," Risk, Feb. 1990, at 25–28.
Jon Stein, "Where Corporate Treasurers Can Look for Software Help," Futures, Oct. 1989, at 50.
Mark Voorhees, "Pension Management," Institutional Investor, Jan. 1988, at 57.
Trudy Ring, "Wells Fargo Gets Most New Business in Dynamic Hedging," Pensions and Investment Age, Feb. 9, 1987, at 31.
Lewis Koflowitz, "Hedging Tools Provide Portfolio Security Blanket," Wall Street Computer Review, Mar., 1989, at 43.
Salman Azhar et al., "Data Compression Techniques for Stock Market Prediction," Proceedings of the 1994 IEEE Data Compression Conference, Snowbird, Utah, Mar. 29–31, 1994, at 72–82.
R. Dembo and D. Rosen, *The Practice of Portfolio Replication*, Algorithmics Tech. Paper No. 98–01 (1997).
*Planned Supplement to the Capital Accord to Incorporate Market Risks*, Basle Committee on Banking Supervision, Bank of International Settlements, Basle, No. 16 (Apr. 1995).
Phillipe Jorion, *Value at Risk: The New Benchmark for Controlling Derivatives Risk*, 185–203 (Irwin Professional Publishing 1997).
John C. Hull, *Options, Futures and Other Derivatives (3E)*, 416–31 (Prentice–Hall 1997).
Harry Markowitz, Portfolio Selection, The Journal of Finance, vol. 7, No. 1, 77–91 (1952).
W.F. Sharpe, Capital Asset Prices: A Theory of Market Equilibrium Under Conditions of Risk, The Journal of Finance, vol. 19, No. 3, 425–42 (1964).
*RiskMetrics™ Technical Document*, Morgan Guarantee Trust Co. Global Research (4th ed. 1996).
Ron Dembo et al., Analytical Compression of Portfolios and VaR, Algorithmics Tech. Paper No. 96–01 (1997).
Mark B. Garman, Issues and Choices in Analytic (Variance-–Covariance) Value at Risk (presented at the RIMAC 97 Conference, Scottsdale, Arizona, Feb. 1997).
Black et al., The Pricing of Options and Corporate Liabilities, Journal of Political Economy, 637–55 (1973).
C. Albanese and L. Seco, Harmonic Analysis in Value at Risk Calculations, Working Paper, RiskLab–Univeristy of Toronto (1996) (accepted for publication in Finance and Stochastics).

* cited by examiner

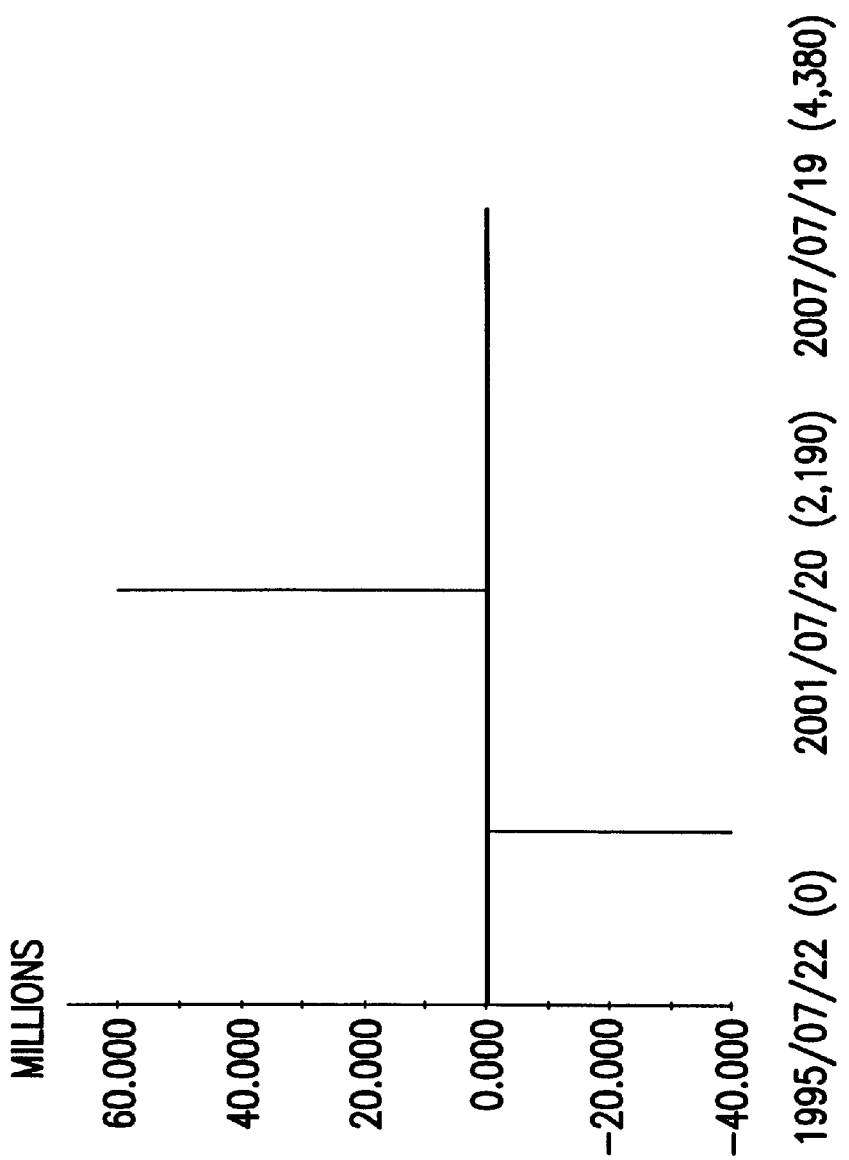

COMPUTER-IMPLEMENTED METHOD AND APPARATUS FOR PORTFOLIO COMPRESSION

This application claims priority to Provisional Application No. 60/057,927, filed May 29, 1997.

BACKGROUND OF THE INVENTION

The present invention relates generally to the field of data processing, and in particular to a computer-implemented method and apparatus for compressing a portfolio of financial instruments to enable, for example, more efficient risk management processing than is otherwise achievable with an uncompressed portfolio.

Risk management is a critical task for any manager of a portfolio of market instruments, and accurate and efficient risk measurement is at the core of any sound enterprise-wide risk management strategy. Given the relatively-complex mathematical calculations necessary to accurately measure risk, financial institutions generally use some form of computer-implemented "risk management engine." As explained below, however, existing risk management engines may be insufficient to adequately deal with the large, complex portfolios maintained by many financial institutions.

It is not unusual for large and medium-sized financial institutions, such as banks or insurance companies, to require a risk management engine that allows the computation of daily Value-at-Risk (VaR) estimates of an entire portfolio, which may contain several hundred thousand positions, including substantial volumes of complex derivative products such as swaps, caps and floors, swaptions, mortgage-backed securities, and so on. Moreover, these several hundred thousand positions may have to be evaluated over hundreds or even thousands of different scenarios. To further complicate the task, these financial institutions may require decision support tools for managers and traders that allow performance of inter-day calculations in near-real time.

In general, financial institutions are required to measure their overall risks for regulatory purposes and as a basis to manage their capital more efficiently. While the former has been driving the development of risk oversight programs in financial institutions worldwide in the last few years, the latter provides a high value-added to those willing to make the investment. Traditionally, portfolio managers have been using standard deviation and variance to measure their portfolio risk. This practice is based on modern portfolio theory, as described in, for example, Harry Markowitz, Portfolio Selection, The Journal of Finance, vol. 7, no. 1 (1952), and W. F. Sharpe, Capital Asset Prices: A Theory of Market Equilibrium Under Conditions of Risk, The Journal of Finance, vol. 19, no. 3 (1964). However, in the last decade, both regulators and businesses have embraced more general (and perhaps more sophisticated) measures such as Value-at-Risk. VaR gives the maximum level of losses that a portfolio could incur, over some predetermined period of time, with a high degree of confidence. For regulatory purposes, for example, the time period may be set to 10 days, and the one-sided confidence interval to 99%. See, e.g., Planned Supplement to the Capital Accord to Incorporate Market Risks, Basle Committee on Banking Supervision, Bank of International Settlements, Basle, No. 16 (April 1995). Although VaR can be expressed as a multiple of the portfolio standard deviation in some simple cases, such as when portfolios are normally distributed, this generally is not the case.

There are different methods available to estimate VaR, depending on the assumptions one is willing to make with respect to the possible future market moves and the complexity of the portfolio. Such methods are described generally in RiskMetrics™ Technical Document, Morgan Guarantee Trust Company Global Research (4th ed. 1996), and Phillipe Jorion, *Value at Risk. The New Benchmark for Controlling Derivatives Risk* (Irwin Professional Publishing 1997). The most generally-applicable method is based on simulation, either historical or so-called "Monte Carlo" simulation. In particular, some simulation may be unavoidable to get an accurate picture of risk when a portfolio contains substantial positions in instruments with optionality, such as options, convertible bonds, mortgages and loans with embedded options. However, given the complexity and computational requirements of known simulation methods, users must trade accuracy for price, time and ease of implementation. Moreover, full simulation of very large and complex portfolios, such as those encountered in many financial institutions today, may not be achievable in a reasonable time period even with top-of-the-line computers. For example, a VaR estimate of a large, complex portfolio over several thousand Monte Carlo scenarios could easily take several hours, if not days, for a top-of-the-line work station. Indeed, even the simple task of loading and storing large portfolios can be onerous and time consuming.

In an effort to address the practical problems associated with risk measurement for large and/or complex portfolios, it is known to adopt an approach in which a subject portfolio (also called the "target" portfolio) is first divided into a "linear" subportfolio and a "non-linear" subportfolio. The former would contain all of the instruments having little or no optionality, while the latter would contain all of the options. In a typical institution, the linear portfolio might comprise 70–95% of the total portfolio positions. However, given their nature, the risks embedded in option positions may be substantial. The next step in such an approach is to measure the risk of these subportfolios separately. For the linear subportfolio, one could apply, for example, a "delta-normal methodology" such as that described in the above-cited RiskMetrics™ Technical Document. By assuming linearity of the subportfolio and normal distributions, this analytical method has moderate computational requirements. For the options, some basic, perhaps limited, simulation can be applied. Finally, an estimate of the risk of the target portfolio is taken as the sum of the individual subportfolio risks.

A significant problem with this approach, however, is presented by the last step. To illustrate, consider a simple example where a trader sells a call option on a given bond and immediately buys a hedge on the underlying bond. Although the bond clearly reduces the portfolio's risk, the above-described methodology would indicate that the VaR of the portfolio has increased (and in fact almost doubled). In general, a mix of methodologies may grossly overestimate VaR since it fails to account for the main principles of risk management: hedging and diversification. This may result in undesirable penalties for good risk management policies.

In view of the shortcomings with known approaches for risk management of large and/or complex portfolios, including but not limited to the shortcomings discussed above, it is apparent that there is a need for a computer-implemented process that is capable of representing such portfolios in a compact way, and that achieves such compression (e.g., loads instruments, generates cashflows, compresses, etc.) quickly and efficiently. Likewise, in contrast to the division approach discussed above, there is a need for a single methodology that enables measurement of risk across an entire portfolio. Such a single methodology should offer sufficient computational efficiency to permit accurate risk measurement to be completed in a reasonable time period regardless of the size and/or complexity of the target portfolio. Embodiments of the present invention satisfy these and other needs.

SUMMARY OF THE INVENTION

The present invention is generally directed at providing improved tools for risk management of large and/or complex portfolios of financial instruments. In accordance with particular embodiments of the invention, as described herein, a "compressed portfolio" is generated for a given target portfolio of financial instruments. In general, the compressed portfolio is a relatively smaller and/or simpler portfolio that closely mimics the behavior of the target portfolio, but that requires orders of magnitude less computer memory to store and orders of magnitude less computational time to value. Thus, the compressed portfolio can be used, for example, for risk measurement analyses instead of the target portfolio, thereby providing substantial improvements in computer resource usage with little or no reduction in accuracy.

In accordance with one particular embodiment, a computer-implemented method for compressing a portfolio of financial instruments is provided. Financial instruments to be compressed are identified, and a compressed subportfolio corresponding to the set of financial instruments to be compressed is generated. The compressed subportfolio and any non-compressed financial instruments are then combined into a compressed portfolio.

BRIEF DESCRIPTION OF THE DRAWINGS

FIG. 7 illustrates an example of a set of cashflows produced by application of analytical compression according to an embodiment of the present invention.

DETAILED DESCRIPTION

Figure 1:
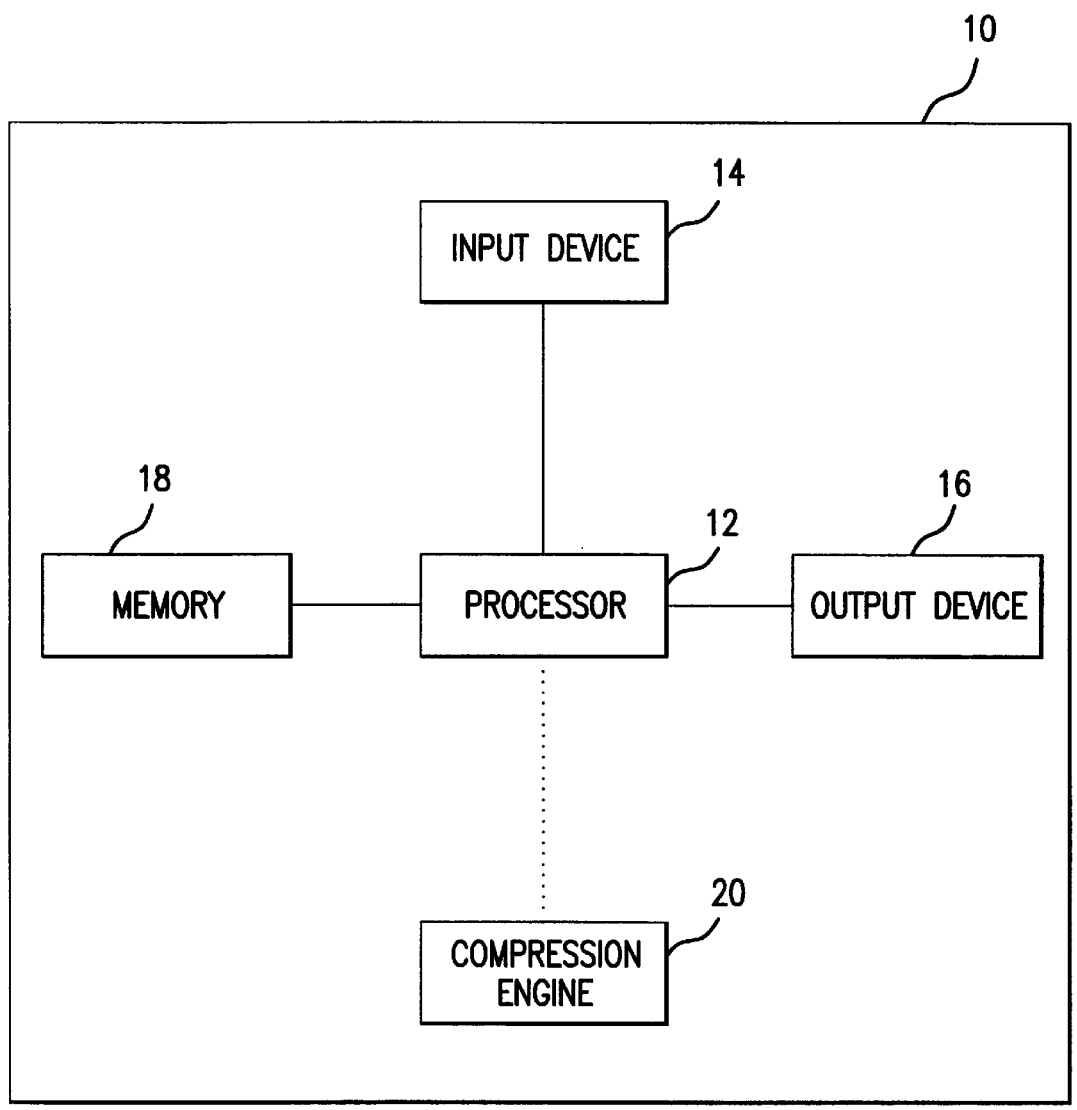
FIG. 1 is a block diagram illustrating a computer-implemented apparatus for portfolio compression in accordance with an embodiment of the present invention.

Embodiments of the present invention are directed to providing advanced portfolio tools for reducing the substantial computational requirements of modem portfolio management. In accordance with such embodiments, a "compressed portfolio" is generated for a target portfolio, and risk measurement calculations are then performed on the compressed portfolio. As used herein, the term "compressed portfolio" contemplates a relatively small and/or simple portfolio that behaves almost identically to an original large and/or complex portfolio, but that requires orders of magnitude less computer memory to store and orders of magnitude less computational time to value. For most purposes, a compressed portfolio need not mimic an original portfolio forever and under every possible state of the world, but rather only during a specified period of interest and over a range that certain specified market factors may take during that period. In addition to computational tractability, compressed portfolios are also powerful tools enabling risk managers to better understand and actively manage their portfolios. By representing portfolio behavior in simpler terms, one can gain insight into the exposures of large portfolios and identify possible remedial actions.

Embodiments of the present invention may be implemented, for example, using a so-called "compression engine." Given a target portfolio of financial instruments, a compression engine provides a means for creating a compressed portfolio consisting of simpler and/or fewer instruments that will replicate the behavior of the target portfolio over a range of possible market outcomes for a pre-defined period in the future. The computational effort to perform a risk analysis of the compressed portfolio is substantially less than that of the target portfolio. Furthermore, given its simplicity, the compressed portfolio provides a better understanding of the market risks facing the holder.

A general goal of such a compression engine is to pre-process a portfolio before attempting to simulate the portfolio's performance over a range of possible market scenarios. The product of this preprocessing stage is generally a smaller and simpler portfolio that is orders of magnitude faster to simulate, but that behaves almost identically to the original portfolio and contains the same risk.

In practice, implementing an efficient process for portfolio compression is not a straight-forward task. Given the nature of any particular portfolio and the objective(s) of any particular analysis, different compression methods may be more appropriate for different instruments. For example, various options may be compressed optimally with one analytical technique, while instruments without optionality may be better compressed using a different analytical technique. Accordingly, embodiments of the present invention provide compression engines that are both robust and extendible.

To a limited extent, a compression engine in accordance with embodiments of the present invention may be used in a manner similar to the technique described above whereby an estimate of a portfolio's risk is determined by dividing the target portfolio and applying different techniques to each subportfolio. A principal difference, however, is that the portfolio compression techniques described herein make it possible to avoid the problematic last step where the total risk is derived simply by summing the risks of the respective subportfolios. Here, the VaR of the target portfolio can be obtained by doing a single simulation of the "total compressed portfolio," given by the sum of the individual compressed portfolios. Thus, portfolio compression techniques such as those described herein fully capture portfolio diversification, hedging and correlations among individual positions.

To illustrate the robustness of a compression engine in accordance with embodiments of the present invention, it is possible to implement an embodiment (described further below) with a compression engine that implements two different methodologies for compressing portfolios: analytical compression and scenario-based compression. Analytical compression exploits the analytical properties of cash-flow portfolios. This technique is perhaps best suited for fixed income portfolios without optionality, although it may be generalized to portfolios with options. Scenario-based compression, on the other hand, is based on stochastic optimization techniques and is best suited for portfolios with options. Thus, the compression engine offers a robust implementation capable of handling multiple types of portfolios. Moreover, the extensibility of such compression engines allows the ready implementation of other compression methodologies.

Analytical compression is a practical and powerful methodology for the approximate representation of large cash-flow portfolios that exploits their mathematical properties. The rationale behind analytical compression is relatively straight-forward. To calculate the distribution of portfolio values in the future using a standard simulation, scenarios are usually generated in "risk factor space" (i.e., input) without further information about the subject portfolio. Risk factor space refers to the space of all risk factors including, for example, interest rates, foreign exchange rates, volatilities, index levels, and so on. Thereafter, the portfolio is fully valued under all of those scenarios. Clearly, however, what the analyst is interested in is the portfolio's distribution (i.e., output). Hence, making use of the properties of the portfolio before sampling (i.e., before Monte Carlo generation) results in more efficient calculations. This has an effect similar to applying a variable transformation that captures the portfolio's properties. In addition to the compression of risk factor space, the exploitation of these underlying properties leads to a compact representation of the portfolio. Thus, the extra analytical work yields orders of magnitude increases in computational performance and substantial savings in terms of data storage requirements. In short, the results of analytical compression are (1) a new, compressed representation of a target portfolio by a small number of simple instruments (e.g., bonds) that depend on a new, smaller set of risk factors, and (2) an exact process that describes the behavior of the new underlying risk factors as a function of the original ones. The mathematical underpinnings of analytical compression are described below with reference to particular embodiments of the present invention. Further details can be found in Ron Dembo et al., Analytical Compression of Portfolios and VaR, Algorithmics Technical Paper No. 96-01 (1997), which disclosure is incorporated herein by reference.

In contrast to analytical compression, scenario-based compression is an especially effective technique for compressing portfolios that contain options. The technique draws on stochastic optimization methods called "scenario optimization," described in Ron Dembo, Optimal Portfolio Replication, Algorithmics Technical Paper No. 95-01 (1997), and "optimal portfolio replication," described in Ron Dembo and Dan Rosen, The Practice of Portfolio Replication, Algorithmics Technical Paper No. 98-01 (1997). Analytical compression may be implemented, for example, using embodiments of the inventions described in U.S. Pat. No. 5,148,365, issued on Sep. 15, 1992 and titled "Scenario Optimization," and recently-allowed U.S. patent application Ser. No. 08/866,303 titled "Method and Apparatus for Optimal Portfolio Replication." The disclosures of these four references are incorporated herein by reference.

In general, for a target portfolio comprised of a given set of market-traded instruments, scenario optimization aims to find the best possible "replicating portfolio" that replicates the behavior of the target portfolio over a range of discrete market outcomes, or scenarios. For purposes of portfolio compression, the replicating portfolio does not necessarily have to be made up of market-traded instruments, as long as one has good models to generate "fair market prices" for the replicating instruments. In practice, as discussed further below, it is possible to generate the proper scenarios and replicating instruments that will lead to an effective replication of a given portfolio by using simple rule-based systems. The mathematical underpinnings of scenario-based compression are described below with reference to particular embodiments of the present invention.

Referring now to FIG. 1, in accordance with a first embodiment of the present invention a computer-implemented apparatus 10 is provided for performing portfolio compression. Computer-implemented apparatus 10 may run under any suitable architecture providing sufficient computing power and storage capacity. It may operate as a standalone system, or may be integrated, for example, as part of a larger system of financial analysis tools.

In the embodiment shown in FIG. 1, computer-implemented apparatus 10 includes a processor 12 for performing logical and analytical calculations. Processor 12 may comprise, for example, a central processing unit (CPU) of a personal computer, but may alternatively include any other type of computer-based processor capable of performing such functions. In one particular implementation, for example, processor 12 could operate on a "UNIX" brand or other "POSIX"-compatible platform under "MOTIF/X WINDOWS" or "WINDOWS NT." Processor 12 is coupled to a memory device 18 comprising, for example, a high-speed disk drive. An input device 14 is also coupled to processor 12, enabling a user to enter instructions and other data. Input device 14 comprises, for example, a keyboard, a mouse, and/or a touch-sensitive display screen. Input device 14 alternatively, or in addition, may comprise a real-time data feed for receiving an electronic representation of financial instruments. For example, input device 14 could provide a connection to an electronic data network (e.g., the Internet) through a modem (not shown) or other suitable communications connection. Computer-implemented apparatus 10 also includes an output device 16, such as a video display monitor and/or a laser printer, for presenting textual and graphical information to a user. In one particular implementation, processor 12 is capable of executing application programs written in the "C++" programming language using object-oriented programming techniques, but the present invention is not limited in this regard.

In the present embodiment, processor 12 is capable of executing a compression engine 20 configured to perform portfolio compression. In this particular embodiment, compression engine 20 comprises a software module including executable instructions for carrying out various tasks and calculations related to portfolio compression, but persons skilled in the art will recognize that firmware- and/or hardware-based implementations are also possible. Compression engine 20 can be used, for example, to analyze the risk of a large and complex portfolio, or to analyze the performance of a number of hedges against potential losses for a given portfolio. The portfolio compression techniques taught herein are well-suited to such uses because of the improved processing speed and efficiency they provide.

In accordance with the present embodiment, a user may use input device 14 to enter information describing the composition of a target portfolio (i.e., the portfolio to be compressed), including, for example, the number and type of financial instruments in the target portfolio. Alternatively, or in addition, information about the target portfolio could be provided through a real-time data feed. In either case, the information is input to compression engine 20, and may also be stored in memory device 18. After compression engine 20 completes its processing, the compressed portfolio is presented on output device 16 in the form of, for example, graphs, textual displays and/or printed reports. In addition, an electronic representation of the compressed portfolio may be stored in memory device 18 for later output to other tasks within computer-implemented apparatus 10, and may also be written to a portable storage device (not shown) such as a CD-ROM or one or more diskettes.

Figure 2:
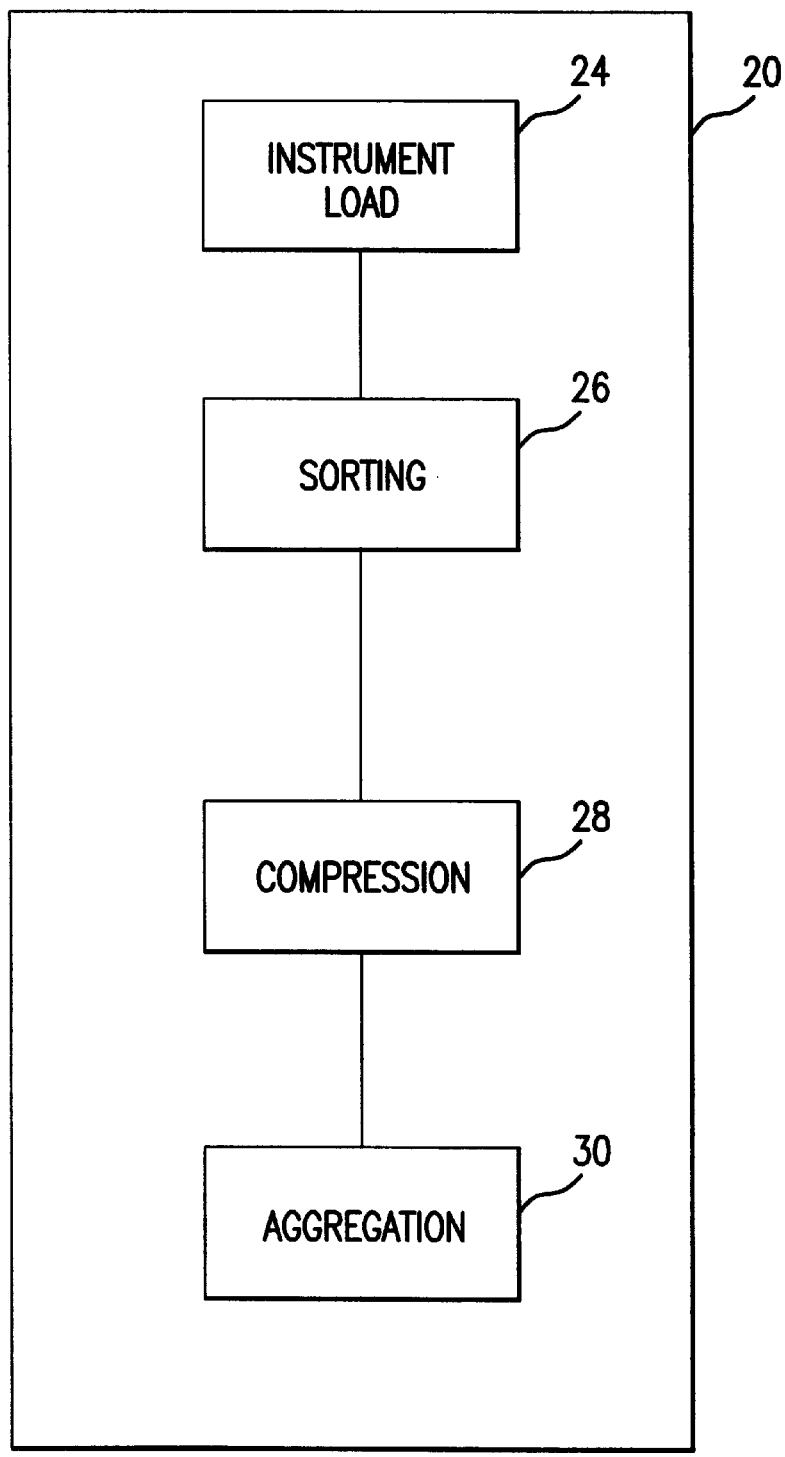
FIG. 2 is a block diagram illustrating a particular implementation of a compression engine in accordance with the embodiment shown in FIG. 1.

According to a particular implementation of the embodiment shown in FIG. 1, as illustrated in FIG. 2, compression engine 20 can be configured to include a number of sub-modules corresponding to various tasks for accomplishing portfolio compression. Persons skilled in the art of software design will recognize, however, that any particular software configuration is generally only a matter of design choice. As shown, in this implementation compression engine 20 includes an instrument load module 24, a sorting module 26, a compression module 28, and an aggregation module 30. These various modules can be configured to pass information from one module to the next (e.g., by passing parameters comprising addresses for locations in memory device 18), or the modules may be given access to common data stores within memory device 18. In any event, the present invention is not limited to any particular implementation.

Figure 3:
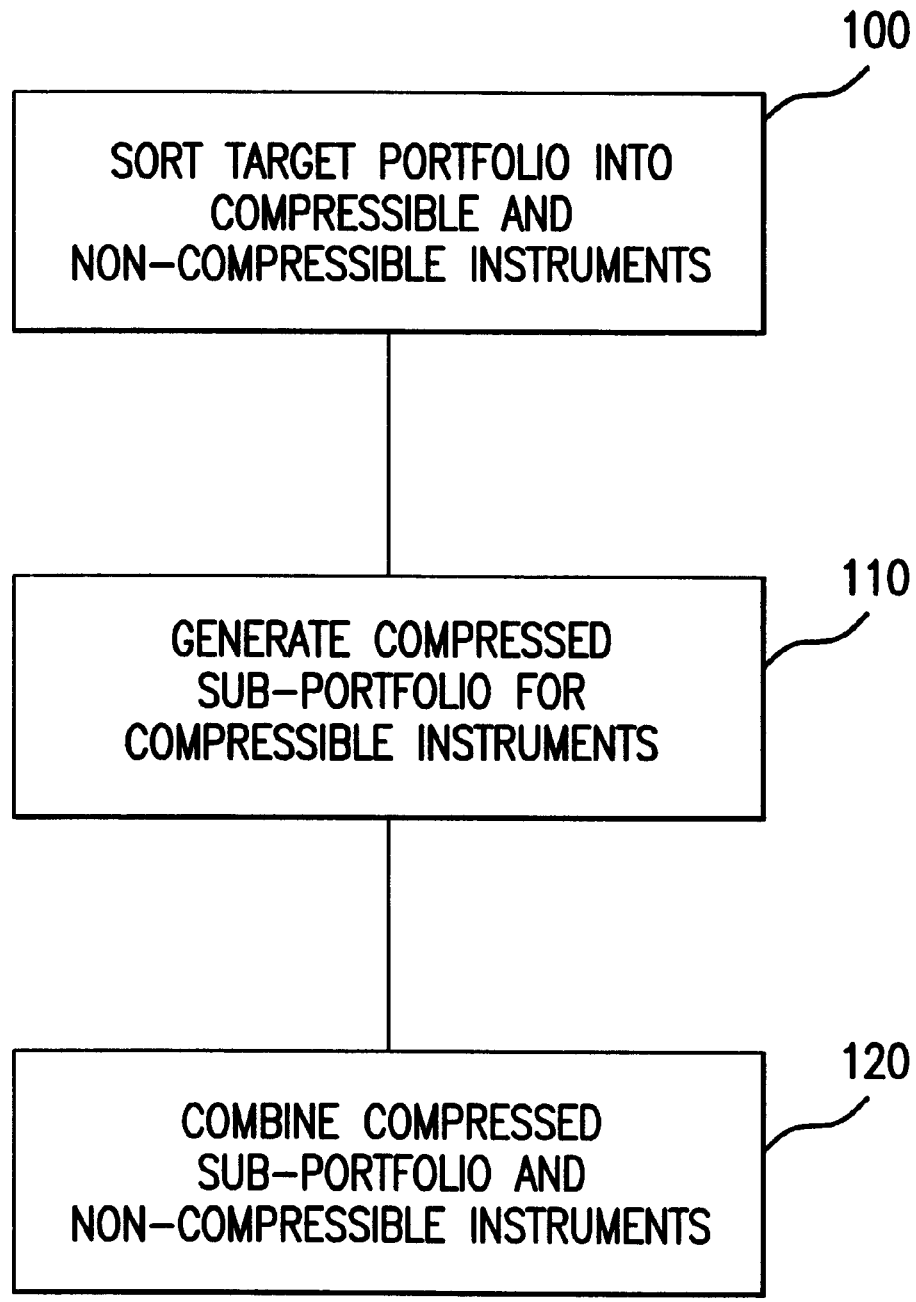
FIG. 3 is a flow diagram illustrating a general method for portfolio compression in accordance with an embodiment of the present invention.

FIG. 3 contains a flow diagram describing a general embodiment of a method for portfolio compression that may be implemented using, for example, the apparatus illustrated in FIG. 1. In accordance with this embodiment, a target portfolio containing a collection of financial instruments is first sorted into compressible and non-compressible instruments (Step 100). This step may be accomplished, for example, by instrument load module 24 and sorting module 26 of the embodiment illustrated in FIG. 2. Next, a compressed subportfolio is generated for the compressible instruments (Step 110) using, for example, compression module 28. Finally, the compressed subportfolio and the non-compressible instruments are combined into a single compressed portfolio (Step 120) using, for example, aggregation module 30.

Of course, it is possible to implement an embodiment such that all of the financial instruments in the target portfolio are deemed to be compressible, in which case the method of FIG. 3 would essentially include only generation of the compressed subportfolio (Step 110). Thus, in the context of the present invention, the term "compressible" does not necessarily connote any particular characteristic of a financial instrument. Rather, the determination of whether a financial instrument is compressible can be user-driven. A given portfolio manager, for example, may be willing to accept a lower degree of confidence with respect to a compressed portfolio than another portfolio manager, and therefore may consider a particular financial instrument to be compressible where the latter portfolio manager would not.

Figure 4:
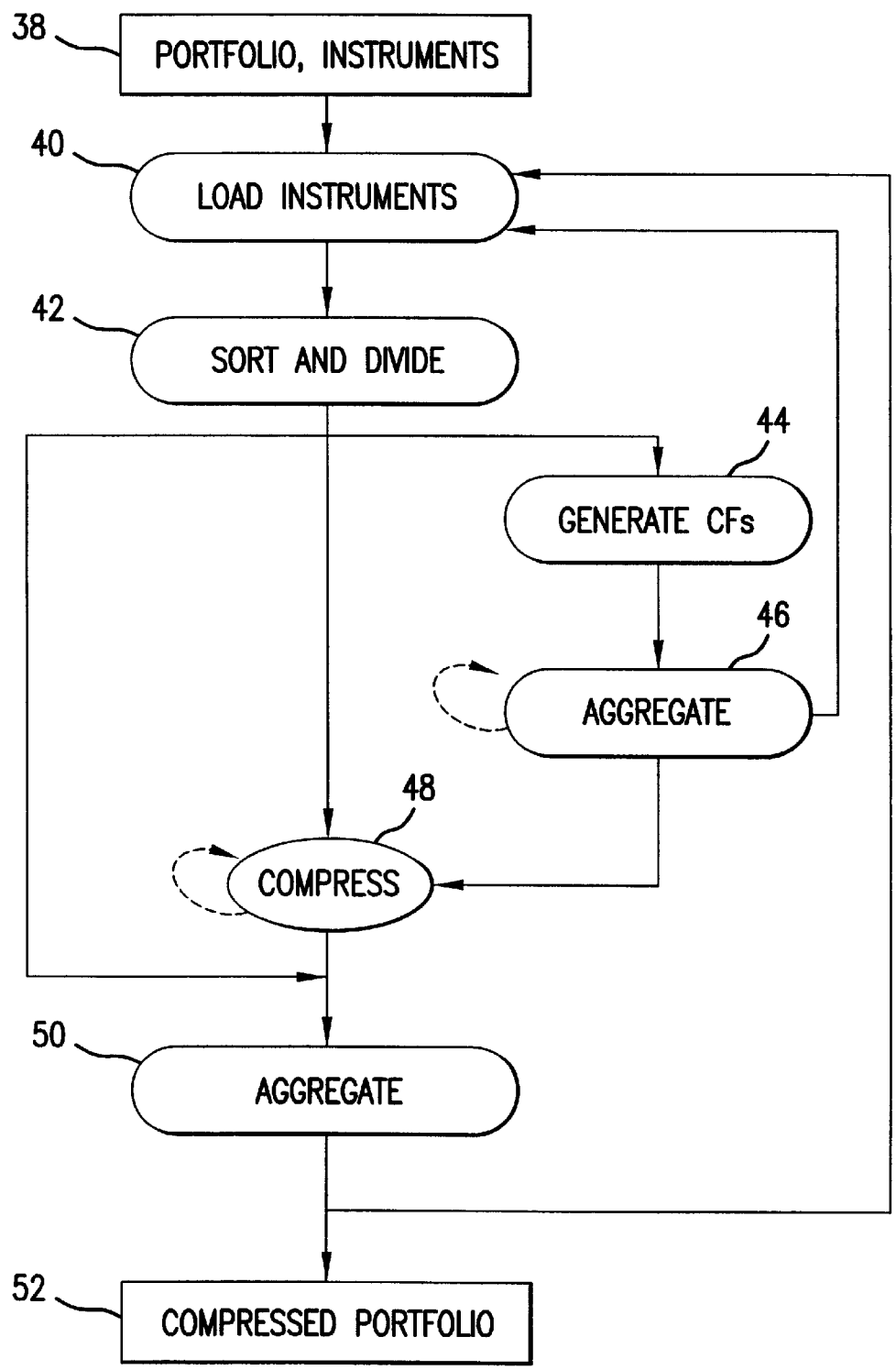
FIG. 4 is a flow diagram illustrating a method for portfolio compression in accordance with another embodiment of the present invention.

By way of further illustration, FIG. 4 contains a flow diagram showing a method for portfolio compression in accordance with another embodiment of the present invention. This method may be implemented, for example, using an apparatus such as that illustrated in FIG. 1, although any other suitable computing apparatus may be used. Referring now to FIG. 4, in accordance with this embodiment a target portfolio of instruments 38 is to be compressed. To this end, instruments 38 are first input to a load instruments routine 40. Instruments 38 may be received, for example, as a collection of data packets defining the composition of the target portfolio. Electronic representations of the financial instruments in the target portfolio can be loaded from an external storage medium (e.g., a data warehouse, a database, a set of comma separated values (.csv) files). In some cases it may be desirable to load the data packets incrementally (e.g., in batches), such as where the size of the target portfolio makes it impractical to load information concerning all of the financial instruments into memory at one time (resulting in significant performance degradation due to disk swapping). In such cases, and with reference to the apparatus of FIG. 1, the size of each incremental load can be set through a parameter passed, for example, to compression engine 20 through a GUI (graphical user interface) or a configuration file, and would typically be based on limitations of memory device 18.

After confirming the validity of the information conveyed in the received data packets using appropriate edit routines (not shown), the information describing the instruments in the target portfolio is subjected to a sort and divide routine 42 where instruments 38 are first divided into subportfolios according to a set of predefined user preferences, or "key attributes." Key attributes may include, for example, information such as a counterparty, a discount curve, and so on. In one particular implementation, sort and divide routine 42 implements a new portfolio hierarchy representing a desired level of portfolio aggregation that a portfolio manager, for example, wishes to use for overall risk analysis. These subportfolios may then be further sorted or subdivided according to the set of compression techniques, if any, that will later be applied to them. Such further processing is desirable where, for example, a single compression technique is not ideal for all of the different types of financial instruments in the target portfolio.

Some subportfolios generated by sort and divide routine 42 may consist of instruments for which compression is undesirable or unnecessary, and such subportfolios are immediately migrated to a temporary storage location (e.g., a location within memory device 18 corresponding to a cash account) for later aggregation with compressed subportfolios. There are several reasons why an institution might choose not to compress certain subportfolios. For example, the institution might wish to retain certain small subportfolios for further analysis. Likewise, the institution might not be able to compress certain subportfolios and still maintain a desired level of accuracy, or the available current compression techniques might not be well-suited for the type of instruments in a particular subportfolio. The remaining subportfolios, each of which will be compressed separately, are then passed to a cashflow generation routine 44 if they contain instruments with fixed cashflows, or directly to a compression routine 48 if they do not.

Cashflow generation routine 44 generates cashflows for the instruments in an input subportfolio based on the financial description of each such instrument. For example, the cashflows of a fixed rate bond are generated from the maturity date, notional, and coupon rate. The output from cashflow generation routine 44 is a set of cashflows on specific dates in the future corresponding to the input instruments, and this output is passed to a first aggregation routine 46. Those instruments that are already represented by their cashflows are passed directly to aggregation routine 46. In aggregation routine 46, all of the cashflows that are discounted with a common interest rate curve are then aggregated (i.e., netted) into a single synthetic bond that pays the netted cashflows of all instruments at the specified times. This synthetic bond is denoted an "aggregated cashflow instrument," or ACI. The output of aggregation routine 46 is thus a subportfolio containing one or more ACIs, as well as instruments that cannot be represented by fixed cashflows. Thus, whereas the input to aggregation routine 46 contained only real financial instruments traded by the institution, the output contains synthetic, non-traded instruments. For all intents and purposes, however, the input subportfolio and the output subportfolio behave identically. Since it is quite common in fixed-income portfolios to have a very large number of instruments that either generate only fixed cashflows (or can be represented for valuation purposes as generating only fixed cashflows), the potential savings that results from this processing is enormous. In a particular implementation of this embodiment, aggregation routine 46 can be executed recursively as a target portfolio is incrementally loaded.

As shown in FIG. 4, compression routine 48 receives subportfolios from aggregation routine 46 and/or sort and divide routine 42. In compression routine 48, subportfolios are generally compressed into a reduced, simpler set of instruments. Again with reference to the apparatus of FIG. 1, where compression engine 20 is configured to perform analytical compression, each set of fixed cashflows instruments, whose value depends on a single interest rate curve, is compressed to at most two cashflows. As with aggregation routine 46, compression routine 48 may be implemented to execute recursively as instruments are incrementally loaded. Compression routine 48 may be configured to perform an extended type of analytical compression to deal with options, although it may be more advantageous to implement a configuration of compression engine 20 that also is capable of performing scenario-based compression on subportfolios with options, since scenario-based compression generally results in compressed subportfolios that contain options as well.

In addition to analytical compression and scenario-based compression, compression routine 48 is preferably configured to be extensible, thereby allowing for the integration of other compression routines. Thus, in general, the input to compression routine 48 is a subportfolio that may be subjected to one or more available compression techniques. The particular techniques applied may be dictated, for example, by a user or by characteristics of the portfolio to be compressed. The compressed instruments might appear to be real traded instruments, but they do not necessarily have to be traded for purposes of risk management.

Finally, all of the subportfolios, both compressed and non-compressed, are passed to a second aggregation routine 50 to be combined into a single compressed portfolio 52. Compressed portfolio 52 can then be used, for example, as the basis for various risk assessment analyses of the target portfolio.

Looking more closely at some of the routines in the embodiment illustrated in FIG. 4, in one implementation sort and divide routine 42 is configured to divide the input target portfolio (or a portion of the target portfolio, in the case of incremental loading) into smaller subportfolios by, for example, a sorting process based on some user-defined set of key attributes. Each key attribute is associated with a particular feature or characteristic of a financial instrument, and serves as a sort key on which the collection of financial instrument information can be sorted. The judicious use of key attributes allows a user to refine the contents of each subportfolio to a level consistent with that user's particular risk management reporting objectives. A list of key attributes can be passed to sort and divide routine 42 using, for example, a GUI or a configuration file.

The use of key attributes provides a convenient way to tailor the operation compression engine 20 to particular uses. For example, key attributes can be used to cause sort and divide routine 42 to generate subportfolios that are particularly directed to the performance of credit risk reporting. In such an implementation, an input portfolio can be partitioned based on attributes such as (a) the legal entities that were the counterparties in the associated transactions, and (b) the jurisdictions where the transactions were booked. Application of these key attributes will result in the input portfolio being divided into subportfolios associated with different legal entities, and further being divided into subportfolios associated with different jurisdictions. These subportfolios could be further divided based on instrument type (e.g., option, fixed income). It should be noted, however, that such a sorting approach is presented by way of example only. The most advantageous key attributes for any particular implementation will vary, for example, in accordance with the particular reporting needs of a given institution or a particular type of risk analysis.

Since a target portfolio will most likely contain many different types of financial instruments, and since different instruments have different characteristics and are suitable for different compression methods, an institution may choose to compress only some of the instruments and use only some of the available types of compression techniques. Accordingly, in a variation on the example shown in FIG. 4, sort and divide routine 42 may apply an additional set of key attributes to further sort the instruments into subportfolios based on whether or not they will be compressed and, if so, the particular compression methodology(s) that will be applied. In other words, those instruments that will eventually be compressed are separated from those instruments that will not be compressed, and the instruments that will eventually pass through one or more of the compression routines are sorted into subportfolios based on the compression technique or combination of techniques that will be performed on them. Thus, in addition to specifying a list of key attributes to be used in creating a subportfolio hierarchy, a user may also specify the types of compression techniques that will be applied. By configuring compression engine 20 to include a function library for compression that is both flexible and extendible, users can be given the ability to vary the composition of the resulting subportfolios (in essence, a list of compressible instruments) according to the compression methodology desired.

Referring again to the embodiment shown in FIG. 4, the input subportfolios to cashflow generation routine 44 are comprised of instruments that either generate only fixed cashflows or can be represented for valuation purposes as generating only fixed cashflows. Such instruments include, for example, fixed rate bonds, floating a rate notes, forward rate agreements, futures and forward contracts, foreign exchange forwards, fixed notional swaps and certificates of deposit. In many cases, cashflow instruments are advantageously represented in computer-implemented apparatus 10 in terms of their financial and accounting descriptions, and not directly as actual cashflows. Thus, cashflow generation routine 44 generates the cashflows of these instruments based on these financial descriptions. Nevertheless, for purposes of valuation, risk measurement and compression, it may sometimes be desirable to represent these instruments by a series of cashflows occurring at certain times in the future, in which case their present value is equal to these cashflows discounted at appropriate rates. For example, a given fixed rate bond may be described by its maturity, notional, coupon rate and coupon frequency. Future cashflows can then be determined completely from this information, and its mark-to-market valuation can be obtained by discounting the future cashflows using current market rates. Again, however, the particulars may vary in accordance with the particular needs of any given implementation.

Turning now to first aggregation routine 46, as noted above this routine can be configured to generate a new type of instrument, called an aggregated cashflow instrument or ACI, for every interest rate curve. An ACI is simply a synthetic bond that pays the specified cashflows at the specified times. At this stage, all the generated cashflows that are discounted with the same discount curve are aggregated into a single ACI, and cashflows occurring on the same day are netted. The present value can thus be determined by discounting these cashflows using a single discount curve. For example, a portfolio consisting of 5000 fixed rate bonds in US dollars with maturities up to 10 years and paying semi-annual coupons would contain at most 100,000 cashflows. After aggregation, these would be represented by one ACI with at most 2500 cashflows (based on 250 business days per year). Since it is unlikely that these fixed rate bonds would have maturities covering every business day of the year, the actual number would generally be much less than this. Persons skilled in the art will recognize the substantial savings in terms of processing resources possible through such aggregation. Moreover, it should be noted that the subportfolio(s) output from first aggregation routine 46, containing those instruments that could not be represented by a fixed cashflow (e.g., options) and one or more aggregated cashflow instruments, has the same theoretical value and the same sensitivities to the previously-identified risk factors as the input subportfolio(s) since no approximations have been done. Other discounting approaches can alternatively be applied. The present invention is not limited in this regard.

As noted above, portfolio compression is generally a process whereby an input portfolio is represented using simpler instruments, using fewer instruments, or both. In one particular implementation of the embodiment shown in FIG. 4, compression routine 48 applies analytical compression to compress subportfolios containing a large set of cashflows into a much smaller set of cashflows, and also applies scenario-based compression to compress subportfolios containing options. Compression routine 48 is ideally designed to be extendible so that additional compression methodologies can easily be added in a modular way. Implementation of such extensible designs is well known in the field of software development.

The following discussion describes both analytical compression and scenario-based compression in further detail, including mathematical support for the theoretical models underlying the respective compression techniques. It should be noted, however, that the present invention is by no means limited to only these compression techniques, nor to the particular application of these compression techniques set forth herein.

The rationale behind analytical compression is relatively straight-forward. The basic approach is to seek a simpler space for approximating the portfolio with a set of basis functions, such that the stochastic process that the new risk factors follow can easily be found as a function of the original ones. In other words, the basic approach is to seek a lower-dimensional space for approximating the portfolio, such that the process of describing the portfolio price can easily be found as a function of the original risk factors. By expressing the portfolio in the right space and with the right functions, it is possible to achieve a reduction in dimensionality and a much smaller and simpler portfolio to process. By exploiting the functional properties of the portfolios and further using simulation techniques, the application of analytical compression provides substantial improvements in accuracy, and in flexibility, over known approaches to risk measurement, such as the "delta-normal" approach to estimating VaR popularized in J. P. Morgan's RiskMetrics™ methodology (see Riskmetrics™—Technical Document, Morgan Guarantee Trust Company Global Research (4th ed. 1996)). Not only does analytical compression capture higher-order effects, such as convexity of bonds or gamma of options, but the resulting compressed portfolios can also be used directly in simulation with other complex derivative portfolios for on-line VaR calculations.

Analytical compression bears some resemblance to known principal component techniques, where the changes in the risk factor space are captured in a low-dimensional projection of the original space. However, the mapping obtained through analytical compression is not necessarily linear and it optimally accounts for the behavior of the portfolio. Moreover, as a "cashflow impression," analytical compression goes much further than standard cashflow bucketing techniques (discussed below) where, for example, cashflows at given times are mapped to their duration equivalents on adjacent, predetermined nodes. Not only does analytical compression preserve the global properties of the portfolio more accurately, but it also offers at least an order of magnitude improvement in processing time. To further illustrate the analytical compression technique, the principles and theory of analytical compression are described below in the context of a particular implementation for fixed cashflow portfolios.

By way of background, and as noted above, the Value-at-Risk (VaR) of a portfolio represents the maximum level of losses that a portfolio could incur over some predetermined time period with a high confidence. More formally, $VaR_\alpha(t)$, the VaR with confidence level $\alpha$, for a period $[0, t]$, is given by the solution of the equation $$Pr\{V(R_0, 0) - V(R_t, t) \leq VaR_\alpha(t)\} = \alpha \qquad \text{(Eq. 1)}$$

where $V(R_t, t)$ denotes the value of the portfolio at time t; $R_t$ represents the vector of underlying (stochastic) risk factors; and $\alpha$ (one-sided) is typically 0.9 to 0.99. The time interval is usually between 1 and 10 days.

Given this definition of VaR, consider a portfolio of fixed cashflows, $C_i > 0$ at time $t_i$, for $i=1, \ldots, n$. The present value of the portfolio today is given by $$V(r) = \sum_{i=1}^{n} C_i \exp(-r_i t_i) \qquad \text{(Eq. 2)}$$

where $r = (r_1, r_2, \ldots, r_n)$ represents the vector of continuously compounded discount rates at each term.

The "yield to maturity" of the portfolio, y, is the single rate at which all the coupons can be discounted to give the same portfolio value. Hence, it is given by the unique root of the equation $$\sum_{i=1}^{n} C_i \exp(-r_i t_i) = \sum_{i=1}^{n} C_i \exp(-y t_i) \qquad \text{(Eq. 3)}$$

This expression can be written more concisely as the identity $$V(r) = V_y(y)$$

where, for simplicity, we denote $V_y(y) = V(y, y, \ldots, y)$. Note that the solution y to Eq. 3 is not unique if all cashflows do not have the same sign.

The "modified duration" of the portfolio is defined as the (negative) derivative of V with respect to the yield, that is $$D \equiv -\frac{dV_y}{dy} = \sum_{i=1}^{n} C_i t_i \exp(-y t_i) \quad \text{(Eq. 4)}$$

It should be noted that, given that the cashflows are fixed, the yield and duration of the portfolio at a given time can be seen exclusively as functions of the interest rate vector r.

As shown above, the yield of the portfolio can be viewed as an alternative representation of the value of the portfolio. Thus, there is a one-to-one mapping between them. The yield further acts with a similar functional form as the rates to give the value of the portfolio.

In view of the foregoing, to obtain the distribution of changes in value of the portfolio, and VaR, using the pricing function $V_y(y)$, one first determines the distribution of the yield. This is not hard task if the joint distribution of the rates is known, since it can be shown that the instantaneous yield changes follow the equation $$dy = \sum_{i=1}^{n} \frac{\partial y}{\partial r_i} \cdot dr_i = \sum_{i=1}^{n} \beta_i \cdot dr_i \quad \text{(Eq. 5)}$$

where $$\beta_i \equiv \frac{dy}{dr_i} = \frac{C_i \cdot t_i \cdot \exp(-r_i t_i)}{D}, \quad i = 1, \ldots, n \quad \text{(Eq. 6)}$$

We refer to $\beta \equiv (\beta_1, \beta_2, \ldots, \beta_n)$ as the vector of yield sensitivities. Note also that an interesting simple identity that arises directly from Eq. 2 and Eq. 6 is $$\sum_{i=1}^{n} \frac{1}{t_i} \cdot \frac{\partial y}{\partial r_i} = \frac{V(y)}{D(y)} \quad \text{(Eq. 7)}$$

For a sufficient large n and rapidly decreasing correlation, the distribution of yield changes, dy, can be approximated by normal distribution. This is true even for larger changes because of the central limit theorem.

Since it is customary to assume that the relative changes of the rates follow a joint normal distribution, it is convenient to express Eq. 5 as $$dy = \sum_{i=1}^{n} \beta_i \cdot r_i \cdot \frac{dr_i}{r_i} \quad \text{(Eq. 8)}$$

Then, the volatility of yield changes can be computed as $$\sigma_{\Delta y}^2 = \sum_{i,j} \beta_i \beta_j \sigma_i \sigma_j r_i r_j \rho_{ij} \quad \text{(Eq. 9)}$$

where $\sigma_i$ represents the volatility of the i-th return, and the $\rho_{ij}$ are the entries in the correlation matrix. In matrix form this can be more compactly expressed as $$\sigma_{\Delta y}^2 = (\beta \cdot r)^T \Sigma (\beta \cdot r)$$

with $\Sigma_{ij} = \sigma_i \sigma_j \rho_{ij}$, and again we use the vector multiplication, that is, $(\beta \cdot r)_i = \beta_i r_i$.

It is important to emphasize that the differential process for the yield can be precisely known, given the joint process for the original risk factors (the individual rates, in this case). In principle, no approximation is required. For a more formal presentation of this observation, see Appendix 1 of Ron Dembo et al., Analytical Compression of Portfolios and VaR, Algorithmics Technical Paper No. 96-01 (1997), which discussion is incorporated herein by reference.

The results above can already be used to simplify VaR calculations using simulation by reducing the sample space from n (the dimension of changes in r) to one dimension (changes in y). One can then use $V_y(y)$ to value the portfolio, which still requires the evaluation of a series of n terms. This yield-based Monte Carlo method is a faster and more robust method than simple Monte Carlo because of the reduction in parameter space and the fact that the yield's volatility is much smaller than volatilities of the rate returns. Furthermore, for a portfolio of strictly positive or strictly negative cashflows, VaR can be calculated analytically, without simulation, by noticing that $V_y(y)$ is monotonic and applying the one factor theorem described in Section 2 of Ron Dembo et al., Analytical Compression of portfolios and VaR, Algorithmics Technical Paper No. 96-01 (1997), which discussion is incorporated herein by reference. For more general portfolios, performance can be improved even further by making some approximations, as shown below.

The transformation from yield to value, $V_y$, still requires the discounting of n cashflows. However, an efficient approximation of this function can be used for VaR calculations. For a portfolio of only positive (or only negative) cashflows, it is possible to reduce the problem to the computation of a single cashflow, such as a zero coupon bond. That is, the function $V_y$ can be approximated by $$\tilde{V}(y) = C \exp(-yt). \quad \text{(Eq. 10)}$$

The two new parameters in this expression, C and t, are found by matching, value and modified duration while using the yield calculated with Eq. 3; that is, from the following, two expressions $$C \exp(-yt) = \sum_{i=1}^{n} C_i \exp(-y t_i) \quad (\text{match } V) \quad \text{(Eq. 11)}$$

$$t = \frac{\sum_{i=1}^{n} C_i t_i \exp(-y t_i)}{\sum_{i=1}^{n} C_i \exp(-y t_i)} \quad (\text{match } D) \quad \text{(Eq. 12)}$$

Of course, $\tilde{V}(y)$ is also monotonic, and therefore the VaR approximation could be computed without simulation. The result of this approximation is a series of exponentials with a single exponential function that matches both value and first derivative at one point, and where the term $(-y\ t)$ "averages" the exponents in the series. In fact, it is shown in Appendix 2 of Ron Dembo et al., Analytical Compression of Portfolios and VaR, Algorithmics Technical Paper No. 96-01 (1997) (which discussion is incorporated herein by reference) that, for portfolios of positive cashflows, $\tilde{V}(y)$ is always dominated by $V_y(y)$, the exact value. That is, $$V_y(y) \geq \tilde{V}(y), \text{ for all non-negative } y \quad \text{(Eq. 13)}$$

The reciprocal is true for portfolios of negative cashflows.

For portfolios with both positive and negative cashflows, the yield, given by the root of Eq. 3 above, is not unique. A simple solution to this problem is to divide the subject portfolio into two subportfolios, one with strictly positive and the other with strictly negative cashflows. The total value of the portfolio can then be expressed as $V=V^-+V^+$ where $$V^+ = \sum_{i=1}^{n} C_i^+ \exp(-r_i t_i), \quad V^- = \sum_{i=1}^{n} C_i^- \exp(-r_i t_i) \quad \text{(Eq. 14)}$$

and $C_i^+ \geq 0$, $C_i^- \leq 0$.

The yields ($y^+$, $y^-$) of both subportfolios are unique in this case, and the total portfolio can be compressed into two cashflows, a positive and a negative one. The two compressed portfolios, respectively, have yields ($y^+$, $y^-$), computed through Eq. 3, coupons ($C^+$, $C^-$) and durations ($t^+$, $t^-$), computed through Eq. 11 and Eq. 12. Thus, the portfolio value function can be approximated by $$\tilde{V}(y^+, y^-) = C^+ \exp(-y^+ t^+) + C^- \exp(-y^- t^-) \quad \text{(Eq. 15)}$$

It can be shown that the volatilities and covariance of ($y^+$, $y^-$) are given by the following expressions $$\sigma_+^2 = (\beta^+ \cdot r)^T \sum (\beta^+ \cdot r) \quad \text{(Eq. 16)}$$
$$\sigma_-^2 = (\beta^- \cdot r)^T \sum (\beta^- \cdot r)$$
$$Cov(y^+, y^-) = (\beta^+ \cdot r)^T \sum (\beta^- \cdot r)$$

The VaR of the portfolio can be computed through a Monte Carlo simulation on the two-dimensional space ($y^+$, $y^-$) and using $\tilde{V}$as in Eq. 15. Given the low dimensionality and simple valuation, this is an effective computational technique. Furthermore, other low-dimensional integration techniques may be more effectively used in this case (e.g., low discrepancy sequences). Notice also that the property of strict monotonicity of $\tilde{V}$ in each risk factor, ($y^+$, $y^-$), can be exploited to accelerate simulations.

Consider now the case of a cashflow portfolio denominated in a different currency, thus having foreign exchange (FX) risk in addition to the interest rate (IR) risk. The value of the portfolio in the domestic currency can be expressed as $$V(r, S) = S \sum_{i=1}^{n} C_i \exp(-r_i t_i) \quad \text{(Eq. 17)}$$

where S now denotes the spot exchange rate from the foreign currency (the value of one unit of foreign currency in domestic currency). Without loss of generality, assume that all the cashflows are positive. By using the results in the previous section, it is possible to approximate the value function of Eq. 17 with $$\tilde{V}(y,S) = S \cdot C \exp(-yt) \quad \text{(Eq. 18)}$$

In this sense, the portfolio can be seen as one position in a bond in the foreign currency. Note the intrinsic multiplicative functionality of the FX spot rate.

A straight-forward approach to estimating VaR is to create scenarios in two-dimensional space (y, S) and use Eq. 18. Clearly, when the portfolio has both positive and negative cashflows, the joint application of Eq. 15 and Eq. 18 leads to a simulation in the three-dimensional space ($y^+$, $y^-$, S).

Alternatively, further approximations may be possible. For example, Eq. 18 may be written as $$\tilde{V}(y, S) = C \cdot S_0 \cdot \exp\left[\left(\frac{\ln(S/S_0)}{t} - y\right)t\right] \quad \text{(Eq. 19)}$$
$$= C_S \cdot \exp(-Y_S t) \equiv \tilde{V}(Y_S)$$

where $S_0$ denotes the current spot FX value and $$Y_s = \left(y - \frac{\ln(S/S_0)}{t}\right).$$

Similar to Eq. 8 above, the differential changes in $Y_s$ are then given by $$dY_S = \sum_{i=1}^{n} \frac{\partial Y_S}{\partial r_i} \cdot dr_i + \frac{\partial Y_S}{\partial S} \cdot dS \quad \text{(Eq. 20)}$$
$$= \sum_{i=1}^{n} \beta_i \cdot r_i \cdot \frac{dr_i}{r_i} + \beta_S \cdot S \cdot \frac{dS}{S}$$

where the $\beta_i$'s, i=1, ... n, are as given before, and $\beta_s = 1/(S \cdot t)$.

It should be noted that Eq. 19 reduces the problem to the single cashflow case, and hence its VaR can be computed analytically. However, in practice, the errors in the distribution introduced can be substantial when compared with those that arise from using the yield approximation of Eq. 18 exclusively. The main sources of these errors arise from the discrete approximation of Eq. 20 and the degree of non-normality of the distribution of $Y_s$.

Considering now a general multi-currency, multi-curve case, this can be solved by an iterated application of the above-described single currency case. Consider the general case of a global portfolio consisting of m subportfolios denominated in different currencies (the first of which is the domestic currency), where the portfolio contains IR risk factors. The value of the whole portfolio in the domestic currency can then be expressed as $$V = \sum_{k=i}^{m} S_K \sum_{i=1}^{n_k} C_{ki} \exp(-r_{ik} t_{ik}) \quad \text{(Eq. 21)}$$

where k is used to index the currencies and $S_1=1$. The total dimension of the risk parameter space, in this case, is dim=$\Sigma n_k + m - 1$. When the number of IR risk factors in each subportfolio is given by a constant $n_r$, then this simply becomes $m(n_r+1)-1$. For example, a typical portfolio with 5 currencies and 16 term structure points (e.g., using the RiskMetrics™ term points), would then involve a problem with dimension 84:5*16 (IRs)+4 (FX). By applying the results of the previous section, the portfolio can be compressed to be valued as $$V_A = \sum_{k=1}^{m} S_k [C_k^+ \exp(-y_k^+ t_k^+) + C_k^- \exp(-y_k^- t_k^-)] \quad \text{(Eq. 22)}$$

where the $y_k$'s, $C_k$'s, and $t_k$'s denote the yields, coupons and durations of each subportfolio respectively. The dimension in this case is now dim=3m−1 (the 2m random yields ($y_k^+$, $y_k^-$), k=1, ... m, and the m−1 FX spot rates $S_k$, k=2, ..., m). The risk factor space for the portfolio in the example above with 5 currencies would then be compressed to have dim=14. It should be noted that further simplifications are possible where the dimension can be reduced to 2 risk factors. This is accomplished, for example, by first applying Eq. 19 and then compressing all the resulting positive and negative cashflows into two cashflows using the yield approximation.

The techniques just described dealt mostly with fixed cashflow instruments; however, the techniques can also be used effectively for portfolios that contain floating instruments and derivatives. Methods such as the fixed notional method and approximations such as delta bucketing (see below) can be used to express most cashflow instruments in terms of fixed cashflows. Thus, the part of a portfolio without optionality, which typically accounts for 80–90% of the entire portfolio, can be compressed to a few positions, and the risk profile of the entire portfolio can be computed using a Month Carlo simulation. The computation in this case is much faster and retains full accuracy. This is in sharp contrast to a pure covariance (e.g., RiskMetrics™) methodology where the substantial higher-order effects of derivatives, and even bond convexities, are not accounted for. Moreover, from a data processing perspective, analytical compression is ideal for batch processes, greatly enhances effectiveness of overall portfolio storage and loading/downloading, and releases vast amounts of memory for other processing.

As alluded to above, "bucketing," and in particular "cashflow bucketing," is a known technique for reducing a total number of cashflows produced by a set of instruments. In general, bucketing is a technique that is desirable in practice not only for performance reasons, but also because distributions are generally only available for a small number of term points. For example, for fixed income instruments, the J. P. Morgan distributed data sets (see the above-cited RiskMetrics™—Technical Document) have volatilities and correlations for sixteen term points.

Industry standards for bucketing of fixed income instruments include "duration bucketing" and the bucketing suggested in RiskMetricsT. Given a set of standard term nodes, both methods map each cashflow separately to the two (or one) closest nodes. Duration bucketing accomplishes this by matching the present value and the duration of the original cashflow. The bucketing described in RiskMetrics™ does this by matching present value and the volatility of the original cashflow. A further assumption of linear interpolation between the prices of zero coupon bonds is required. Additional information on these two bucketing techniques, including their relative advantages and disadvantages, can be found in the above-cited RiskMetrics™—Technical Document and Mark B. Garman, Issues and Choices in Analytic (Variance-Covariance) Value at Risk (presented at the RIMAC 97 Conference, Scottsdale, Ariz., February 1997).

By contrast, delta bucketing provides a more powerful and robust technique than either duration bucketing or the RiskMetrics™ approach. Delta bucketing is generally applicable to all financial instruments, but is perhaps most appropriate for linear instruments. Delta bucketing aims to standardize the times at which cashflows occur. For fixed income instruments, delta bucketing reduces the number of cashflows in a portfolio by redistributing them over the standard term structure. This redistribution of the cashflows is done in a such a way that the partial derivatives (or key rate durations) of each individual instrument or cashflow with respect to each of the original risk factors is preserved.

The foregoing bucketing methods bucket each cashflow separately to the nearest nodes, without regard for the portfolio to which they belong. Hence, some global portfolio properties, such as its yield to maturity and duration, will not be preserved, because such properties are not additive. Preserving these properties for each individual cashflow does not guarantee that the property at the portfolio is preserved. By contrast, so-called "yield bucketing" maps all portfolio cashflows by preserving these global portfolio properties. In this way, cashflows are bucketed to standard nodes, accounting for all other cashflows in the portfolio, by assuring that the new bucketed portfolio preserves the same value, yield, and duration of the original portfolio. This is a desirable feature where the bucketing technique is to be used in conjunction with analytical compression, since the yield becomes the single risk factor that the portfolio depends on.

Turning now to the details of scenario-based compression, in accordance with a particular embodiment of the present invention, compression engine 20 can be configured to perform scenario-based optimization as follows. A portfolio or subportfolio to be compressed is passed to a cashflow and embedded option analyzer that returns a set of maturities for all instruments in the subportfolio, a set of underlying risk factors, and a range of strike prices for any embedded options.

The output from cashflow and embedded option analyzer, along with a description of the type of analysis to be performed (e.g., 10-day VaR at 99% confidence, 1-month VaR at 95%), then serves as input to a replicating set generator. The information concerning analysis type can be obtained, for example, from a user through a GUI or from a configuration file. The replicating set generator outputs a set of replicating instruments that effectively "spans," or covers, the target portfolio. The output from the cashflow and embedded option analyzer and the information concerning analysis type also serves as input to a scenarios generator that returns a set of scenarios and time points under which the replication is to be performed. The scenarios generator may generate scenarios dynamically, or may retrieve previously-generated scenarios from, for example, a database. In general, the operations of the replicating set generator and the scenarios generator are governed by a simple rule-based system, an example of which is set forth below.

Acting on the set of replicating instruments, the target portfolio and the set of scenarios, a simulation module determines the values of every instrument in the target portfolio under every scenario at the specified time points. The results of the simulation module are then input to an optimization problem module, which formulates a linear programming problem to find the optimal replicating portfolio. This problem is then solved using standard linear programming techniques and associated software (e.g., the CPLEX™ application distributed by ILOG of Incline Village, Nev.). The solution to the problem is a set of positions to take in the replicating instruments that best matches the behavior of the target portfolio over the specified scenarios. Finally, a construct compressed portfolio module constructs the compressed replicating portfolio from the output of optimization problem module. For example, the construct compressed portfolio module may generate a report identifying actual market transactions to carry out in order to construct the replicating portfolio. The set of instruments contained in the replicating portfolio (i.e., the replicating instruments) might include many different types of instruments, including instruments with optionality (e.g., bond options, caps/floors), in order to provide a more robust replicating portfolio for non-linear instruments.

The scenario-based compression model rests on a number of assumptions. For example, it is assumed that a compressed portfolio will be used as a surrogate for the corresponding target portfolio over some finite period of time (hereinafter, the "replication period"). During the replication period, it is assumed that only a finite number of events or scenarios S can occur; however, there is uncertainty as to which of these events will actually occur. Accordingly, the probability of an $i^{th}$ future event occurring at some point during the replication period is denoted by $p^i \in R^S$.

A second assumption underlying the scenario-based compression model is that only a finite number N of financial instruments are available for creating the compressed portfolio. Because the compressed portfolio will only be used as a surrogate for valuing the target portfolio and its attributes, it may be made up of any instruments whose prices are known. Moreover, the liquidity of the instruments is not relevant unless the compressed portfolio is to be used for purposes other than valuation (for example, hedging).

Figure 5:
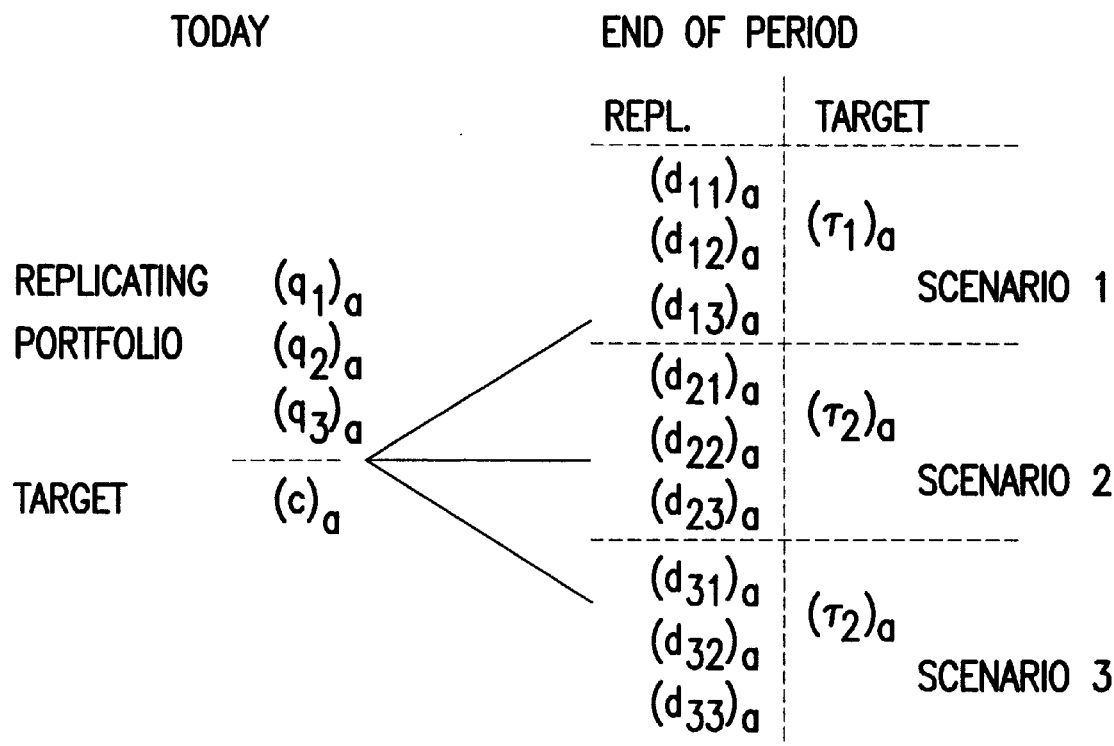
FIG. 5 sets forth a notation convention applicable to a scenario-based compression technique that can be applied by an apparatus configured in accordance with the embodiments illustrated in FIGS. 1–4.

FIG. 5 sets forth notation conventions that will be used in explaining further the technique of scenario-based compression. In addition, a superscript T will denote the transpose of a vector or matrix. Applying the convention described in FIG. 5, let $q_a=((q_1)_a, (q_2)_a, \ldots, (q_N)_a)^T$ be the known values, at the start of the replication period, of attribute a (a=1, ..., A) of each candidate instrument for the compressed portfolio. From time to time, we will drop the subscript "a" when a generic statement applying to any attribute is made.

Further, let $D_a$ be the S by N matrix that gives the possible values of attribute a (a=1, ..., A) of each instrument in each scenario. That is, each entry $(d_{ij})_a$ is the value of instrument j (j=1, 2, ..., N) at the end of the replication period, if scenario i (i=1, 2, ..., S) were to occur. Similarly, we assume the target portfolio has attributes valued at $c_a$ at the beginning of the replication period, and attributes valued at $\tau_a=((\tau_1)_a, (\tau_2)_a, \ldots, (\tau_2)_a)^T$ (a=1, ..., A) at the end of the replication period depending on which scenario(s) actually occur. A portfolio is characterized by the vector "x," with each component $x_j$ denoting the amount the portfolio contains of instrument j (j=1, 2, ..., N).

$E(\tau)=\tau^T_p$ will denote the expectation of τ over the probability distribution p. Finally, $E(D_a)=D^T_a p$ denotes an N-dimensional column vector of expected values of attribute a of the instruments in the compressed portfolio at the end of the replication period.

Given the foregoing, a tracking function may be used to measure the degree to which a compressed portfolio matches a corresponding target portfolio under the possible values that the attributes might assume during the replication period. The tracking function may be expressed as $$T(x) = \sum_{i=1}^{A} \|D_a x - \tau_a\|.$$

The actual choice of norm used to measure the deviations between the compressed portfolio and the target portfolio will depend on the context and the desired statistical properties of the solution. For example, one could choose standard regret or maximum error as the error measure; and all errors, only positive errors, or only negative errors may be minimized. In this measure, weighting constants $w_a$ are used to emphasize one attribute over another and to apply a conversion to consistent units. For example, if standard regret, including all errors, is chosen then $$\|D_a x - \tau_a\| = w_a E(|D_a x - \tau_a|) = w_a (p_S^T |D_a x - \tau_a|).$$

As another example, if maximum error, including all errors, is chosen then $$\|D_a x - \tau_a\| = w_a \max_s \left| \sum_{j=1}^{n} (d_{sj})_a x_j - (\tau_s)_a \right|.$$

In order to guarantee that the target and compressed portfolios are as close as possible over the entire chosen period, it is natural to require that the values of relevant attributes for both portfolios are the same under current conditions. This leads to the following set of boundary conditions: $q_a^T x = c_a$; a=1, ..., A.

In view of the foregoing, a scenario-based compression model may thus be expressed in a relatively straight-forward manner. According to this model, there always exists a feasible compressed portfolio (that is, one satisfying the equation below), provided there are more independent instruments from which the compressed portfolio is selected than there are attributes that must be matched at the start of the replication period. This model can be described mathematically as follows:

$$T^* = \min_x T(x) = \min_x \sum_a \|D_a x - \tau_a\|$$

subject to $q_a^T x = c_a = 1, \ldots, A$. That is, the equation is to minimize the tracking function over all possible amounts of each instrument in the compressed portfolio, while at the same time ensuring that the total value of such instruments is equal to the value of the target portfolio.

In accordance with a variation on the above-described embodiments of the present invention, a compressed portfolio generated by, for example, compression engine 20 of the embodiment shown in FIG. 1, may be subjected to post-processing where the compression process generates instruments that depend on new risk factors (i.e., risk factors that were not present in the original, uncompressed target portfolio). These new risk factors may be provided, for example, by a market risk factors' distribution module. In accordance with this variation, a scenario generation module creates a set of scenarios based on these new risk factors, or alternatively adds the new correlated scenarios to an existing scenario set, after which the institution's risk profile can be calculated using the compressed portfolio and the new scenario set. Such post-processing is described further in the above-cited reference titled Analytical Compression of Portfolios and VaR, the pertinent disclosure of which is incorporated herein by reference.

For compression techniques such as analytical compression, the risk factor space will typically include some new variables (e.g., the compressed yields). To simulate the value of the global portfolios under changing market conditions, with both compressed portfolios and portfolios that are not compressed, scenarios must be generated from the joint distribution of the market factors and the new risk factors. These joint distributions are readily available from the yield sensitivities which describe the stochastic processes they follow (see the discussion of analytical compression above). If a scenario set in the original risk factors exists, each scenario is augmented to include the new risk factors (using, for example, Eq. 8, 9 and 16 above).

The following examples are presented to further illustrate features and advantages provided by embodiments of the present invention. The first example involves application of a compression engine, such as that shown in FIG. 2, to a simple portfolio, and demonstrates both the accuracy and possible time savings that may be realized. Consider a small portfolio of long and short positions in 38 US government bonds with maturities ranging from 46 days to 12 years. The current time that was used for valuation purposes was Jul. 22, 1995. This portfolio, which has a theoretical value of $9,482,415.3044 USD, was valued using an upward sloping discount curve whose values at the various term points were approximately 5%. The portfolio was compressed using delta bucketing and analytical compression, after which a VaR number for both the compressed portfolio and the target portfolio were calculated using a Monte Carlo simulation.

Referring again to the embodiment of FIG. 4, data packets describing all of the instruments 38 in the target portfolio were input to load instruments routine 40. Given that the target portfolio was small, it was possible to load all of the instruments at one time. Output from load instruments routine 40 was then input to sort and divide routine 42. In this case, the output from sort and divide routine 42 was identical to the input because:

(1) the only user-defined key attribute was specified as "discount curve," and all instruments were discounted using the U.S. Treasury curve; and (2) it was determined that all of the instruments would be subjected to delta bucketing and analytical compression (i.e., none of the instruments would bypass compression routine 48).

Output from sort and divide routine 42 was then passed to cashflow generation routine 44 and aggregation routine 46, resulting in the cashflows of the 38 bonds being generated and aggregated into a single ACI consisting of 143 cashflows. This single ACI was then passed to compression routine 48, where it was subjected to compression processing using both the delta bucketing and analytical compression techniques.

First, delta bucketing was applied to the portfolio containing the 143 cashflows, resulting in a reduction in the number of cashflows from 143 to 13. These 13 cashflows occur at the standard RiskMetrics™ term points, as discussed more fully in the above-cited *RiskMetrics™—Technical Document*. Next, this reduced set of cashflows was passed to an analytical compression subroutine, and the positive cashflows were separated from the negative cashflows. In each instance (positive or negative) the yield was calculated and the cashflows were compressed to a single zero coupon bond. The output from compression routine 48 consisted of two zero coupon bonds—one with a positive notional and one with a negative notional. In addition, two new risk factors, based on the yield to maturity of each zero coupon bond, were created.

Figure 6:
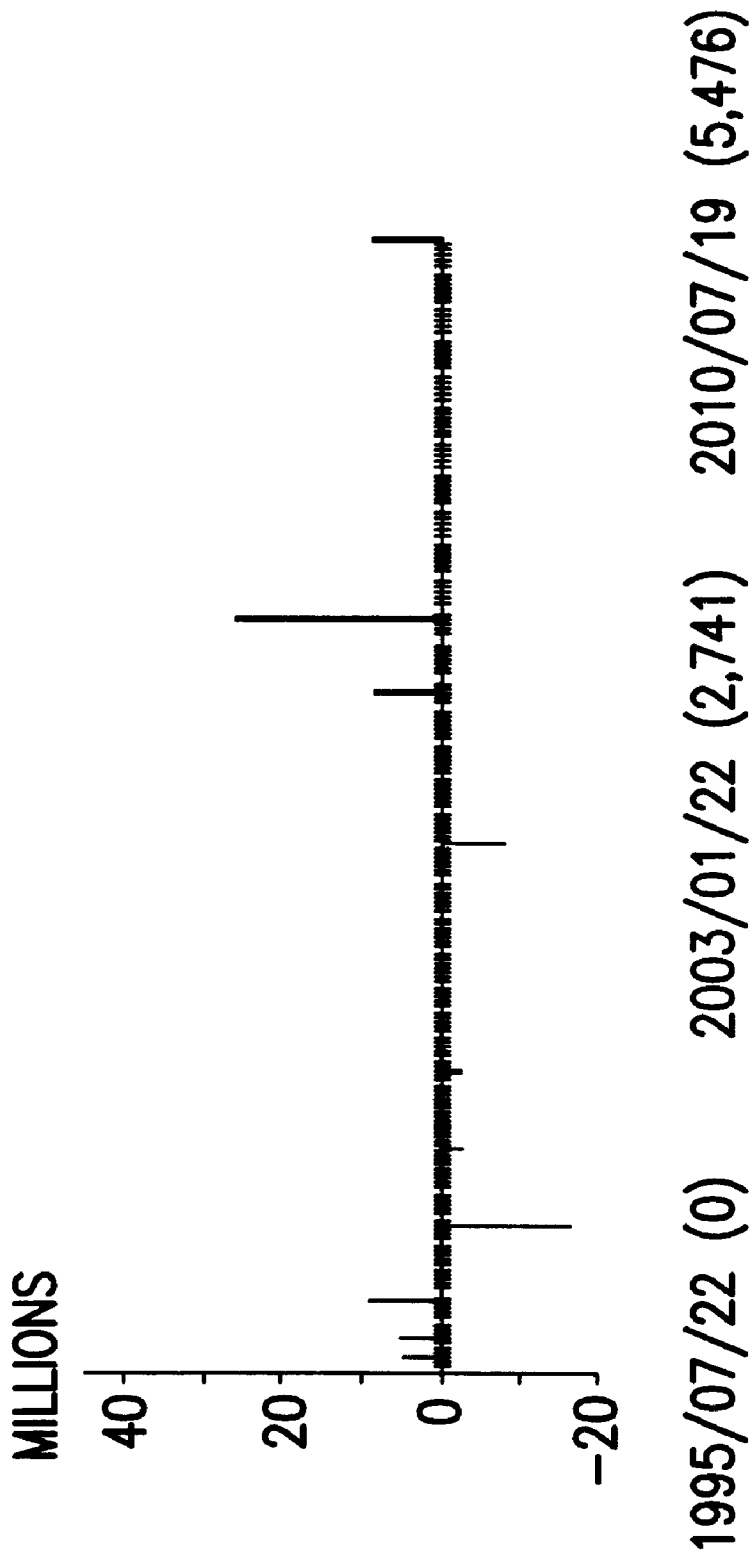
FIG. 6 illustrates an example of a set of cashflows produced by application of delta bucketing compression according to an embodiment of the present invention.

FIG. 6 shows the 13 cashflows produced using the delta bucketing compression technique. Note that a cashflow was created at the 15-year term point, which is three years past the longest maturing bond. FIG. 7 shows the cashflows of the compressed portfolio produced by applying the analytical compression technique to the result of the delta bucketing compression. Here, the first zero coupon bond created has a cashflow on Feb. 22, 1998 of (39,554,346.0729) USD, and the calculated yield is 5.1185%. The second zero coupon bond created has a cashflow of 60,098,278.9511 USD on Sep. 18, 2001, and the calculated yield is 5.5537%. The compressed portfolio consists of the two compressed bonds calculated as set forth above. Scenarios based on the two new yield risk factors were added to the original scenario set using a scenario generation routine, thereby enabling a VaR number to be calculated for the compressed portfolio.

To further demonstrate some of the advantages possible through application of such embodiments of the present invention, a comparison was made of 1-day VaR results based on the following risk management techniques:

(1) linear approximation (i.e., RiskMetrics™);

(2) scenario-based VaR using the target portfolio and 1000 Monte Carlo scenarios on the U.S. Treasury curve; and (3) scenario-based VaR using the compressed portfolio and 1000 Monte Carlo scenarios on the compressed yield risk factors.

The VaR numbers were calculated for three different confidence levels and the simulation results are the average over ten runs. These results are presented in Table 1.

TABLE 1

Comparison of VaR (million $)

| confidence level | 1000 MC using original portfolio | 1000 MC using compressed portfolio | RiskMetrics |
|---|---|---|---|
| .90 | 1.689 (100) | 1.670 (98.88) | 1.553 (91.95) |
| .95 | 1.992 (100) | 1.986 (99.70) | 1.967 (98.74) |
| .99 | 2.645 (100) | 2.630 (99.43) | 2.491 (93.86) |

Note:
Quantities in parentheses represent VaR as a percentage of the original portfolio's scenario-based VaR (column 2).

As can be seen, in each of the three cases the standard deviation of the results for the compressed portfolio were approximately half the standard deviation of the results of the uncompressed target portfolio.

The experiment was then repeated using 4000 Monte Carlo scenarios, with the compressed portfolio again having half the variance of the target portfolio. These results are presented in Table 2.

TABLE 2

Comparison of VaR (million $)

| confidence level | 4000 MC using original portfolio | 4000 MC using compressed portfolio | RiskMetrics |
|---|---|---|---|
| .90 | 1.650 (100) | 1.651 (100.06) | 1.553 (94.12) |
| .95 | 1.961 (100) | 1.967 (100.31) | 1.967 (100.31) |
| .99 | 2.605 (100) | 2.614 (100.35) | 2.491 (95.62) |

Note:
Quantities in parentheses represent VaR as a percentage of the original portfolio's scenario-based VaR (column 2).

In both cases, as illustrated in Table 1 and Table 2, the Value-at-Risk obtained from the compressed portfolio differs from the Value-at-Risk obtained from the original portfolio by at most 1.22%, and is generally much closer. However, the time required to compress the portfolio and calculate the scenario-based VaR from the compressed portfolio varied from approximately 3% to 10% of the time required to calculate the scenario-based VaR from the target portfolio.

In a second example, an embodiment such as that illustrated in FIG. 4 was applied to a more complex target portfolio containing a substantial number of derivative positions. Delta bucketing, analytical compression, and scenario-based compression methodologies were applied to the target portfolio to show the accuracy and time savings that can be achieved.

The target portfolio for this second example consisted of over 18,000 instruments, including many instruments with optionality such as caps and swaptions, in three currencies (British pounds sterling, Japanese yen, and U.S. dollars).

The current time used was Feb. 14, 1996 and the three discount curves (one in each currency) ranged from 5.5% to 6.5%. The instruments that comprised the target portfolio were common stock, European equity options, European FX options, caps, swaptions, fixed notional swaps, fixed rate CDS, fixed rate bonds, swap fixed legs, swap predetermined legs, currency swaps and FX forwards. The number of positions in each instrument are summarized in the second column of Table 3.

TABLE 3

Overall Results Summary (all time in seconds)

| Instrument | Number of Instruments | Simulation time[b] using original portfolio | Simulation time[b] after Analytical Compression | Simulation time[b] after Scenario Optimization | Compression time[b] |
|---|---|---|---|---|---|
| Common Stock | 720 | 177 | | | |
| European Equity Options | 960 | 619 | | | |
| European FX Options | 1200 | 246 | | | |
| Caps | 1200 | 24452 | | 15 | 1476 |
| Swaptions | 1200 | 7000 | | | |
| Fixed Notional Swap | 6000 | 15841 | 13 | | |
| Fixed Rate CD | 1200 | | | | |
| Fixed Rate Bond | 4800 | | | | |
| Swap Fixed Leg | 240 | | | | |
| Swap Pre-Determined Leg | 240 | | | | |
| Currency Swap | 240 | | | | |
| Forex Forward | 240 | | | | |
| Total | 18240 | 48335 | | 1070[a] | 1476 |

Notes:
[a]Sum of: Common Stock (177), European Equity Options (619), European FX Options (246), Analytical Compression (13) and Scenario Optimization (15).
[b]All performance times based on CPU usage on a SPARC station 20, 448 M main memory using single 150 MHz processor. Time is in seconds.
[c]Simulation is based on 1000 Monte Carlo scenarios.

Referring again to the embodiment illustrated in FIG. 4, in load instruments routine 40, data packets describing the instruments 38 in the target portfolio were loaded incrementally in blocks of 400 instruments each. In sort and divide routine 42, the 400 instruments from the input subportfolio were partitioned into 9 subportfolios. These were created based on the key attribute, which in this case was discount curve, and the compression methodologies to be applied to the instruments. Only one discount curve was used for each currency, and hence the input subportfolio was first partitioned into three subportfolios. Next, the three subportfolios were partitioned based on instrument type only, since instrument type was used to determine the compression methodologies used.

In this example, it was determined that the common stock, equity options and FX options were not to be compressed because there were not many of them and they generally do not take long to value. Accordingly, all of those instruments were placed in a temporary storage location for later aggregation. It was further determined that caps and swaptions would be compressed using scenario-based compression, and thus those instruments were placed in a second separate subportfolio that was passed directly to compression routine 48. Finally, it was determined that the remaining 7 instrument types would be compressed using delta bucketing and analytical compression, and thus were placed in a third separate subportfolio that was passed to cashflow generation routine 44 and first aggregation routine 46.

In cashflow generation routine 44 and first aggregation routine 46, the input was one of the three subportfolios (separated by discount curve) containing fixed income instruments. The cashflows of these instruments were generated and then aggregated into a single ACI. The output from these two modules was thus three subportfolios, each consisting of a single ACI.

In compression routine 48, the input subportfolios were compressed using either the analytical compression method or the scenario-based compression method described above. Each subportfolio consisting of caps and swaptions was compressed using the scenario-based compression, where the set of replicating instruments consisted of zero coupon bonds and caplets in each of the three currencies. The scenarios for replication were bucket shifts of 1% to the instruments' discount curves at standard node points, and parallel shifts of three standard deviations in the discount curves, thus capturing higher-order effects. The output of this scenario-based compression was a portfolio of positions in approximately 10 zero coupon bonds and 10 at-the-money caplets.

Each of the three subportfolios consisting of a single ACI was then compressed using delta bucketing and analytical compression. First, delta bucketing was applied, resulting in at most 14 cashflows at the standard RiskMetrics™ term points. Next, this reduced set of cashflows was passed to an analytical compression subroutine and was separated into positive cashflows and negative cashflows. In each instance (positive and negative) the yield was calculated and the cashflows were represented by a zero coupon bond. The output from compression routine 48 was two zero coupon bonds—one with a positive notional, and one with a negative notional. In addition, two new risk factors, based on the yield to maturity of each zero coupon bond, were created. The six subportfolios that were passed through compression routine 48 (i.e., caps and swaptions in three currencies, fixed income instruments in three currencies) comprised the compressed portfolio. The entire process was then repeated until all of the instruments in the target portfolio were loaded and processed. Once there were no more instruments to be loaded, based on the six new yields that were created as risk factors during analytical compression, new scenarios were generated in a scenario generation routine, and these were added to the existing scenario set.

Finally, the VaR for the reduced compressed portfolio was calculated using 1000 Monte Carlo scenarios on the three discount curves. The last column of Table 3 above indicates the times required to create the compressed portfolio and the new scenarios are indicated in the last column. The time required to simulate the scenario-based VaR is indicated in the middle columns.

As can be seen from Table 3, the time required to calculate the VaR of the uncompressed target portfolio was approximately 13.5 hours. The time savings resulting from using various compression methodologies to reduce the size and complexity of the portfolios before the VaR was calculated was substantial—it took only 40 minutes to compress the target portfolio and calculate its VaR.

As shown in Table 4 below, performance was evaluated for the subset of the target portfolio consisting of caps only, due to their apparently disproportionate contribution to the VaR calculation time. This was because the 1,200 nine-year quarterly caps, which are equivalent to over 43,000 caplets, required over 43 million calculations of the standard Black-Scholes formula (see Black et al., The Pricing of Options and Corporate Liabilities, Journal of Political Economy 81 (1973)) in a simulation using 1000 Monte Carlo scenarios.

TABLE 4

Cap Compression Comparison (million $)

|  | Original Caps | Delta Bucketing | Scenario Optimization: "Gamma" Replicated |
|---|---|---|---|
| RiskMetrics VaR | 1155.57 | 1161.60 | 1161.18 |
| 90% Confidence | (100) | (100.52) | (100.49) |
| 1000 MC VaR | 1285.44 | 1341.78 | 1287.72 |
| 90% Confidence | (100) | (104.38) | (100.18) |
| 1000 MC VaR | 1442.85 | 1486.23 | 1442.16 |
| 95% Confidence | (100) | (103.01) | (100.09) |
| 1000 MC VaR | 1828.77 | 1891.20 | 1830.36 |
| 99% Confidence | (100) | (103.41) | (100.09) |
| Replication Time (sec) |  | 312 | 312 |
| Simulation Time (sec) | 24452 | 12 | 36 |

Notes:
[a]Quantities in parentheses represent VaR as a percentage of the uncompressed portfolio's VaR.
[b]All performance times based on CPU usage on a SPARC station 20, 448 M main memory using single 150 MHz processor.
[c]Simulation Time refers to scenario-based VaR calculations, and not to RiskMetrics VaR.

For purposes of further comparison, the caps were compressed using two methods: delta bucketing and scenario-based compression. As also shown in Table 4, the accuracy of the VaR results of the compressed portfolios were compared to the VaR results of the uncompressed portfolio of caps. It can be seen that the scenario-based VaR results of the portfolio compressed with delta bucketing were within 4.5% of the VaR produced using the uncompressed portfolio. The results are even more impressive when scenario-based compression was used to compress the original portfolio—the scenario-based VaR of the compressed portfolio was within 0.2% of the VaR produced using the uncompressed portfolio. Substantial time savings were also realized when the VaR was calculated using the compressed portfolios. The simulation time of the portfolio consisting of 1,200 caps was almost seven hours; whereas the simulation time of the compressed portfolio, including the time required for compression, was less than six minutes.

In view of the foregoing, persons skilled in the art will appreciate that one of the important differences between portfolio compression in accordance with embodiments of the present invention and previously-used portfolio replication techniques (e.g., scenario optimization, described in U.S. Pat. No. 5,148,365, and optimal portfolio replication, described in recently-allowed U.S. patent application Ser. No. 08/866,303) is that here the replicating portfolio need not be comprised of market-traded instruments. Rather, a compressed portfolio need only be comprised of instruments whose price is "known" or "fair" in the particular market under consideration. Thus, as long as one is able to generate a fair market price for an instrument, even if it is not traded, the instrument may be used as part of the replicating set. This feature provides a financial analyst with substantially more flexibility in replicating a portfolio than is provided by previously-known approaches.

Another significant advantage of portfolio compression in accordance with embodiments of the present invention is the lack of liquidity restrictions on the replicating variables (i.e., the positions of instruments in the compressed portfolio). In practice, however, some liquidity restrictions make the solution of the compressed portfolio more stable. This benefit also derives from the fact that the essence of a compressed portfolio, as just discussed, is that it price correctly. Since the compressed portfolio need not be comprised of tradeable instruments, it may contain fictitious instruments in any quantity provided the price of such instruments is "fair" with respect to the market. Such fictitious instruments can be priced using analytical models based on, for example, no-arbitrate conditions or equilibrium principles, as described in John C. Hull, Options, Futures and Other Derivatives (3E) 572 (Prentice-Hall 1997).

Yet another advantage of such portfolio compression techniques is that often one is interested in valuing a target portfolio using some surrogate compressed portfolio for only a very limited period of time. Thus, the replication need only be valid for that limited time period, rather than over the entire expected life of the target portfolio. All of the foregoing observations imply that a replicating portfolio may be generated automatically using fictitious instruments and simple rule-based systems. An example of such a rule-based system is as follows:

(1) if the instrument type is common stock, equity option or FX option, then do not compress;
(2) if the instrument type is cap or swaptions, then compress using scenario-based compression;
(3) if the instrument type is fixed notional swaps, fixed rate CDS, fixed rate bonds, swap fixed legs, swap predetermined legs, currency swaps or FX forwards, then compress using delta bucketing and analytical compression.

Embodiments of the present invention, including those described in detail above, may be distributed, for example, as a set of executable instructions residing on a storage medium. Such a storage medium can be a memory of a computer; a piece of firmware; a portable storage device, such as a diskette or other magnetic storage device, or a CD-ROM; or any other medium on which it is possible to store or otherwise distribute executable instructions.

The foregoing is a detailed description of particular embodiments of the present invention. Persons skilled in the art will recognize, however, that many alternatives, modifications and/or variations of the disclosed embodiments are possible. For example, analytical compression and scenario-based compression are only two of a myriad of techniques that can be used to express portfolios in simpler form. Other techniques have already shown excellent practical results, including so-called Arrow-Debreu Compression, in which results of previous simulations are used to construct a new representation of a portfolio in a piecewise sense (using the analog of delta functions). Also available are so-called Power Series Methods, in which the portfolio value function is approximated by a local series expansion around the current mark-to-market price. These methods, in combination with harmonic analysis, provide an elegant and fast computational technique, as discussed in C. Albanese and L. Seco, Harmonic Analysis in Value at Risk Calculations, Working Paper, RiskLab-University of Toronto (1996) (accepted for publication in Finance and Stochastics). The present invention embraces all such alternatives, modifications and variations that fall within the letter and spirit of the claims, as well as all equivalents of the claimed subject matter.

What is claimed:

1. A computer-implemented method for compressing a portfolio of financial instruments for purposes of portfolio management, the method comprising the steps of:

selecting one or more financial instruments to be compressed from among a plurality of financial instruments in an original portfolio;

generating a compressed subportfolio from the selected financial instruments, wherein said generating includes replacing a subset of the selected financial instruments with a synthetic financial instrument capable of replicating an aggregate behavior of the replaced subset;

combining the compressed subportfolio and any non-compressed financial instruments from the original portfolio into a compressed portfolio;

calculating a measure of risk for the compressed portfolio; and performing risk management of the original portfolio based on the calculated measure of risk for the compressed portfolio.

2. The computer-implemented method of claim 1, wherein the selected financial instruments comprise all of the financial instruments in the original portfolio.

3. The computer-implemented method of claim 1, wherein said step of generating a compressed subportfolio comprises performing analytical compression.

4. The computer-implemented method of claim 1, wherein said step of generating a compressed subportfolio comprises performing scenario-based compression.

5. The computer-implemented method of claim 1, further comprising the steps of:

sorting the selected financial instruments into fixed cashflow financial instruments and non-fixed cashflow financial instruments;

generating one or more aggregated cashflow instruments representing the fixed cashflow financial instruments;

generating a first compressed subportfolio corresponding to the one or more aggregated cashflow instruments; and generating a second compressed subportfolio corresponding to the non-fixed cashflow financial instruments.

6. The computer-implemented method of claim 1, further comprising the step of sorting the selected financial instruments into a plurality of subportfolios to be compressed, wherein said step of generating a compressed subportfolio further comprises separately compressing each of the plurality of subportfolios to be compressed.

7. The computer-implemented method of claim 6, wherein said compressing step further comprises using a first compression methodology to compress one of the plurality of subportfolios to be compressed and a different compression methodology to compress another of the plurality of subportfolios to be compressed.

8. The computer-implemented method of claim 6, wherein said step of sorting the selected financial instruments into a plurality of subportfolios to be compressed comprises separating the selected financial instruments according to a predetermined attribute of the financial instruments.

9. The computer-implemented method of claim 8, further comprising the step of obtaining the predetermined attribute from an external input.

10. The computer-implemented method of claim 1, wherein said step of generating a compressed subportfolio comprises applying a plurality of compression methodologies.

11. A computer-implemented apparatus for generating a compressed portfolio corresponding to an original portfolio of financial instruments, the compressed portfolio being configured to replicate an aggregate behavior of the original portfolio when used to calculate a measure of risk for purposes of performing risk management of the original portfolio, said apparatus comprising:

a processor;

an input device coupled to said processor;

a memory coupled to said processor;

a compression engine including instructions executable by said processor, said instructions being configured to generate a compressed portfolio from an original portfolio comprising a plurality of financial instruments, wherein generation of the compressed portfolio comprises generating a compressed subportfolio corresponding to one or more financial instruments selected from among the plurality of financial instruments in the original portfolio, said generating the compressed subportfolio including replacing a subset of the selected financial instruments with a synthetic financial instrument capable of replicating an aggregate behavior of the replaced subset, and combining the compressed subportfolio and any non-compressed financial instruments from the original portfolio into a compressed portfolio; and an output device.

12. The computer-implemented apparatus of claim 11, wherein said compression engine comprises:

an instrument load module;

a sorting module;

a compression module; and an aggregation module.

13. The computer-implemented apparatus of claim 12, wherein said compression module comprises a plurality of sub-modules respectively corresponding to a plurality of impression methodologies.

14. The computer-implemented apparatus of claim 11, wherein said compression engine comprises:

an instrument load module;

a sorting module coupled to said instrument load module;

a cashflow generation module coupled to said sorting module;

a first aggregation module coupled to said cashflow generation module;

a compression module coupled to said sorting module and said cashflow generation module; and a second aggregation module coupled to said sorting module and said compression module.

15. The computer-implemented apparatus of claim 11, wherein said input device comprises a user interface.

16. The computer-implemented apparatus of claim 11, wherein said input device comprises a real-time data feed.

17. A computer-readable storage medium embodied in a computer and containing a set of instructions for causing a computer to compress a portfolio of financial instruments, said set of instructions including instructions for:

selecting one or more financial instruments to be compressed from among a plurality of financial instruments in an original portfolio;

generating a compressed subportfolio from the selected financial instruments, wherein said generating includes replacing a subset of the selected financial instruments with a synthetic financial instrument capable of replicating an aggregate behavior of the replaced subset;

combining the compressed subportfolio and any non-compressed financial instruments from the original portfolio into a compressed portfolio;

calculating a measure of risk for the compressed portfolio; and performing risk management of the original portfolio based on the calculated measure of risk for the compressed portfolio.

18. The storage medium of claim 17, wherein said set of instructions further comprises instructions for:

sorting the selected financial instruments into fixed cashflow financial instruments and non-fixed cashflow financial instruments;

generating one or more aggregated cashflow instruments representing the fixed cashflow financial instruments;

generating a first compressed subportfolio corresponding to the one or more aggregated cashflow instruments; and generating a second compressed subportfolio corresponding to the non-fixed cashflow financial instruments.

19. The storage medium of claim 17, wherein said storage medium comprises a magnetic storage device.

20. The storage medium of claim 17, wherein said storage medium comprises a computer memory.

* * * * *

UNITED STATES PATENT AND TRADEMARK OFFICE
CERTIFICATE OF CORRECTION

PATENT NO. : 6,278,981 B1  Page 1 of 1
DATED : August 21, 2001
INVENTOR(S) : Dembo et al.

It is certified that error appears in the above-identified patent and that said Letters Patent is hereby corrected as shown below:

Title page,
Item [75], change inventors from: "Ron Samuel Dembo, Ontario; Alexander Yacov Kreinin, Thronhill; Dan Rosen, Toronto, all of (CA)" to
-- Ron Samuel Dembo, Toronto; Dan Rosen, Toronto; Alexander Yacov Kreinin, Thornhill; Asif Lakhany, Markham, all of (CA) --

Column 17,
Line 17, change "Month" to -- Monte --;
Line 39, change "RiskMetricsT" to -- RiskMetrics$^{TM}$ --.

Signed and Sealed this

Twenty-seventh Day of August, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.       : 6,278,981 B1
APPLICATION NO.  : 09/084923
DATED            : August 21, 2001
INVENTOR(S)      : Dembo et al.

It is certified that error appears in the above-identified patent and that said Letters Patent is hereby corrected as shown below:

On the Title Page, item (54), and in the specification, Column 1, title, replace "COMPUTER-IMPLEMENTED METHOD AND APPARATUS FOR PORTFOLIO COMPRESSION" with -- PORTFOLIO COMPRESSION --.

On the Title Page, Related U.S. Application Data (60), replace "Provisional application No. 60/057,927" with -- Provisional application No. 60/050,927 --.

Signed and Sealed this
Fourth Day of February, 2014

Michelle K. Lee
*Deputy Director of the United States Patent and Trademark Office*